(12) United States Patent
Joseph et al.

(10) Patent No.: US 11,770,447 B2
(45) Date of Patent: Sep. 26, 2023

(54) MANAGING HIGH-AVAILABILITY FILE SERVERS

(71) Applicant: Nutanix, Inc., San Jose, CA (US)

(72) Inventors: Tony Joseph, Bangalore (IN); Galaxy Kadiyala, Bangalore (IN)

(73) Assignee: Nutanix, Inc., San Jose, CA (US)

(*) Notice: Subject to any disclaimer, the term of this patent is extended or adjusted under 35 U.S.C. 154(b) by 277 days.

(21) Appl. No.: 16/177,126

(22) Filed: Oct. 31, 2018

(65) Prior Publication Data

US 2020/0137157 A1 Apr. 30, 2020

(51) Int. Cl.
*H04L 67/1095* (2022.01)
*H04L 41/0803* (2022.01)
*H04L 67/06* (2022.01)
*H04L 67/1097* (2022.01)

(52) U.S. Cl.
CPC ...... *H04L 67/1095* (2013.01); *H04L 41/0803* (2013.01); *H04L 67/06* (2013.01); *H04L 67/1097* (2013.01)

(58) Field of Classification Search
CPC ............. H04L 41/0803; H04L 67/1097; H04L 67/1095; H04L 67/06; H04L 69/40
See application file for complete search history.

(56) References Cited

U.S. PATENT DOCUMENTS

| 1,062,581 A | 5/1913 | Brach |
| 1,214,663 A | 2/1917 | Evans |
| 1,979,814 A | 11/1934 | Unger |
| 5,253,252 A | 10/1993 | Tobol |
| 5,276,867 A | 1/1994 | Kenley et al. |
| 5,664,144 A | 9/1997 | Yanai et al. |
| 5,870,555 A | 2/1999 | Pruett et al. |
| 5,873,085 A | 2/1999 | Enoki |

(Continued)

FOREIGN PATENT DOCUMENTS

| CN | 103746997 | 4/2014 |
| CN | 105100210 | 11/2015 |

(Continued)

OTHER PUBLICATIONS

US 11,048,595 B2, 06/2021, Venkatesh et al. (withdrawn)

(Continued)

*Primary Examiner* — Oanh Duong
(74) *Attorney, Agent, or Firm* — Vista IP Law Group, LLP

(57) ABSTRACT

Methods, systems and computer program products for implementing high-availability file services in a clustered computing environment. Two or more clusters are interconnected to carry out operations for replication of file content between file servers. The file servers and their respective network links are registered with a file server witness. The file servers operate in synchrony, where each file I/O is replicated from one file server to another file server over a first set of network paths. A file server witness communicates with each file server using a second set of two or more network paths interfaced with respective file servers. The file server witness monitors the file servers to determine operational health of the file servers. Upon receipt of a file I/O request, the file I/O request is directed to one of the two file servers based at least in part on the determined operational health.

28 Claims, 13 Drawing Sheets

(56) References Cited

U.S. PATENT DOCUMENTS

| | | |
|---|---|---|
| 5,884,308 A | 3/1999 | Foulston |
| 5,924,096 A | 7/1999 | Draper |
| 6,055,543 A | 4/2000 | Christensen et al. |
| 6,085,234 A | 7/2000 | Pitts et al. |
| 6,101,508 A | 8/2000 | Wolff |
| 6,212,531 B1 | 4/2001 | Blea et al. |
| 6,289,356 B1 | 9/2001 | Hitz et al. |
| 6,341,340 B1 | 1/2002 | Tsukerman et al. |
| 6,363,416 B1 | 3/2002 | Naeimi et al. |
| 6,442,602 B1 | 8/2002 | Choudhry |
| 6,539,381 B1 | 3/2003 | Prasad |
| 6,684,397 B1 | 1/2004 | Byer et al. |
| 6,738,801 B1 | 5/2004 | Kawaguchi et al. |
| 6,928,589 B1 | 8/2005 | Pomaranski et al. |
| 6,963,914 B1 * | 11/2005 | Breitbart ............ H04L 67/1095 709/225 |
| 6,968,345 B1 | 11/2005 | Muhlestein |
| 7,120,631 B1 | 10/2006 | Vahalia et al. |
| 7,159,056 B2 | 1/2007 | Goldick |
| 7,162,467 B2 | 1/2007 | Eshleman |
| 7,356,679 B1 | 4/2008 | Le et al. |
| 7,366,738 B2 | 4/2008 | Yorke |
| 7,379,419 B2 | 5/2008 | Collins |
| 7,409,511 B2 | 8/2008 | Edwards et al. |
| 7,421,578 B1 | 9/2008 | Huang et al. |
| 7,461,374 B1 | 12/2008 | Balint et al. |
| 7,606,868 B1 | 10/2009 | Le et al. |
| 7,647,427 B1 | 1/2010 | Devarapalli |
| 7,702,843 B1 | 4/2010 | Chen et al. |
| 7,707,618 B1 | 4/2010 | Cox |
| 7,720,864 B1 | 5/2010 | Muth et al. |
| 7,725,671 B2 | 5/2010 | Prahlad et al. |
| 7,752,492 B1 | 7/2010 | Armangau et al. |
| 7,774,391 B1 | 8/2010 | Le et al. |
| 7,805,469 B1 | 9/2010 | Nagaralu et al. |
| 7,805,511 B1 | 9/2010 | Panicker et al. |
| 7,840,533 B2 | 11/2010 | Prahlad et al. |
| 7,890,529 B1 | 2/2011 | Srinivasan et al. |
| 7,934,117 B2 | 4/2011 | Kakivaya et al. |
| 7,937,453 B1 | 5/2011 | Hayden et al. |
| 7,937,455 B2 | 5/2011 | Saha et al. |
| 7,941,470 B2 | 5/2011 | Le et al. |
| 7,990,962 B2 | 8/2011 | Chang et al. |
| 8,051,252 B2 | 11/2011 | Williams |
| 8,051,262 B2 | 11/2011 | Ichikawa et al. |
| 8,095,810 B2 | 1/2012 | Matsuzawa et al. |
| 8,095,931 B1 | 1/2012 | Chen et al. |
| 8,190,588 B1 | 5/2012 | Gupta et al. |
| 8,219,769 B1 | 7/2012 | Wilk |
| 8,352,482 B2 | 1/2013 | Hansen |
| 8,352,608 B1 | 1/2013 | Keagy et al. |
| 8,359,594 B1 | 1/2013 | Davidson |
| 8,365,167 B2 | 1/2013 | Beaty et al. |
| 8,392,680 B1 | 3/2013 | Natanzon et al. |
| 8,407,448 B1 | 3/2013 | Hayden et al. |
| 8,424,003 B2 | 4/2013 | Degenaro et al. |
| 8,447,728 B2 | 5/2013 | Prahlad et al. |
| 8,473,462 B1 | 6/2013 | Banerjee |
| 8,473,775 B1 | 6/2013 | Helmick |
| 8,484,163 B1 | 7/2013 | Yucel et al. |
| 8,484,356 B1 | 7/2013 | Douglis et al. |
| 8,539,076 B2 | 9/2013 | Nakano et al. |
| 8,543,790 B2 | 9/2013 | Chen et al. |
| 8,549,518 B1 | 10/2013 | Aron et al. |
| 8,601,471 B2 | 12/2013 | Beaty |
| 8,601,473 B1 | 12/2013 | Aron et al. |
| 8,635,351 B2 | 1/2014 | Astete et al. |
| 8,646,089 B2 | 2/2014 | Jayanthi et al. |
| 8,655,851 B2 | 2/2014 | Patwardhan et al. |
| 8,688,660 B1 | 4/2014 | Sivasubramanian et al. |
| 8,725,679 B2 | 5/2014 | Nair |
| 8,751,515 B1 | 6/2014 | Xing et al. |
| 8,762,335 B2 | 6/2014 | Prahlad et al. |
| 8,805,951 B1 | 8/2014 | Faibish et al. |
| 8,838,923 B2 | 9/2014 | Prahlad et al. |
| 8,850,130 B1 | 9/2014 | Aron et al. |
| 8,863,124 B1 | 10/2014 | Aron |
| 8,898,668 B1 | 11/2014 | Costea |
| 8,914,429 B2 | 12/2014 | Pitts |
| 8,935,563 B1 | 1/2015 | Rajaa et al. |
| 8,949,557 B2 | 2/2015 | Kamei et al. |
| 8,966,188 B1 | 2/2015 | Bardale |
| 8,983,952 B1 | 3/2015 | Zhang et al. |
| 8,996,783 B2 | 3/2015 | Huang et al. |
| 9,009,106 B1 | 4/2015 | Aron et al. |
| 9,032,248 B1 | 5/2015 | Petty |
| 9,043,567 B1 | 5/2015 | Modukuri et al. |
| 9,060,014 B2 | 6/2015 | Crowley |
| 9,069,708 B2 | 6/2015 | Gill et al. |
| 9,152,628 B1 | 10/2015 | Stacey et al. |
| 9,154,535 B1 | 10/2015 | Harris |
| 9,165,003 B1 | 10/2015 | Tummala |
| 9,201,698 B2 | 12/2015 | Ashok et al. |
| 9,201,704 B2 | 12/2015 | Chang et al. |
| 9,201,887 B1 | 12/2015 | Earl et al. |
| 9,213,513 B2 | 12/2015 | Hartz et al. |
| 9,244,674 B2 | 1/2016 | Waterman et al. |
| 9,244,969 B1 | 1/2016 | Love et al. |
| 9,256,475 B1 | 2/2016 | Aron et al. |
| 9,256,612 B1 | 2/2016 | Bhatt et al. |
| 9,268,586 B2 | 2/2016 | Voccio et al. |
| 9,274,817 B1 | 3/2016 | Fan et al. |
| 9,286,298 B1 | 3/2016 | Gillett, Jr. |
| 9,286,344 B1 | 3/2016 | Bhardwaj et al. |
| 9,292,327 B1 | 3/2016 | Von Thenen et al. |
| 9,336,132 B1 | 5/2016 | Aron et al. |
| 9,348,702 B2 | 5/2016 | Hsu et al. |
| 9,389,887 B1 | 7/2016 | Aron et al. |
| 9,405,566 B2 | 8/2016 | Chawla et al. |
| 9,411,628 B2 | 8/2016 | Bezbaruah et al. |
| 9,448,887 B1 | 9/2016 | Ben Dayan et al. |
| 9,497,257 B1 | 11/2016 | Love et al. |
| 9,513,946 B2 | 12/2016 | Sevigny et al. |
| 9,519,596 B2 | 12/2016 | Coppola et al. |
| 9,535,907 B1 | 1/2017 | Stringham |
| 9,563,555 B2 | 2/2017 | Flynn et al. |
| 9,571,561 B2 | 2/2017 | Jang |
| 9,590,843 B2 | 3/2017 | Cui et al. |
| 9,619,257 B1 | 4/2017 | Aron et al. |
| 9,634,990 B2 | 4/2017 | Lee |
| 9,639,428 B1 | 5/2017 | Boda |
| 9,639,588 B2 | 5/2017 | Cheng |
| 9,652,265 B1 | 5/2017 | Narayanasamy et al. |
| 9,658,899 B2 | 5/2017 | Jenkins |
| 9,690,670 B1 | 6/2017 | Paulzagade et al. |
| 9,733,958 B2 | 8/2017 | Cui |
| 9,740,436 B2 | 8/2017 | Fiebrich-kandler et al. |
| 9,740,472 B2 | 8/2017 | Sohi |
| 9,740,723 B2 | 8/2017 | Prahlad et al. |
| 9,747,287 B1 | 8/2017 | Bhardwaj et al. |
| 9,772,284 B2 | 9/2017 | Quan et al. |
| 9,772,866 B1 | 9/2017 | Aron et al. |
| 9,779,015 B1 | 10/2017 | Oikarinen et al. |
| 9,832,136 B1 | 11/2017 | Gibson |
| 9,846,706 B1 | 12/2017 | Basov et al. |
| 9,853,978 B2 | 12/2017 | Tellvik et al. |
| 9,870,291 B2 | 1/2018 | Bezbaruah et al. |
| 9,893,988 B2 | 2/2018 | Agarwal et al. |
| 9,898,522 B2 | 2/2018 | Cole et al. |
| 9,940,154 B2 | 4/2018 | Ramani et al. |
| 9,946,573 B2 | 4/2018 | Mcdermott |
| 10,009,215 B1 | 6/2018 | Shorey |
| 10,050,862 B2 | 8/2018 | Nambiar et al. |
| 10,083,022 B2 | 9/2018 | Fukui et al. |
| 10,084,873 B2 | 9/2018 | Dornemann |
| 10,095,506 B2 | 10/2018 | Gopalapura Venkatesh et al. |
| 10,101,989 B2 | 10/2018 | Sinha et al. |
| 10,114,706 B1 | 10/2018 | Chougala et al. |
| 10,127,059 B2 | 11/2018 | Astete et al. |
| 10,140,115 B2 | 11/2018 | Fukui et al. |
| 10,152,233 B2 | 12/2018 | Xu et al. |
| 10,210,048 B2 | 2/2019 | Sancheti |
| 10,210,172 B1 | 2/2019 | Konig et al. |
| 10,248,657 B2 | 4/2019 | Prahlad et al. |

(56) References Cited

U.S. PATENT DOCUMENTS

| | | |
|---|---|---|
| 10,311,153 B2 | 6/2019 | Mason |
| 10,362,092 B1 | 7/2019 | Parthasarathy |
| 10,367,753 B2 | 7/2019 | Schultze et al. |
| 10,379,759 B2 | 8/2019 | Bhardwaj et al. |
| 10,394,547 B2 | 8/2019 | Fukui et al. |
| 10,419,426 B2 | 9/2019 | Bakshan et al. |
| 10,523,592 B2 | 12/2019 | Byers et al. |
| 10,530,742 B2 | 1/2020 | Shah et al. |
| 10,534,634 B2 | 1/2020 | Yang et al. |
| 10,540,164 B2 | 1/2020 | Bafna et al. |
| 10,540,165 B2 | 1/2020 | Bafna et al. |
| 10,540,166 B2 | 1/2020 | Arikatla et al. |
| 10,542,049 B2 | 1/2020 | Cui et al. |
| 10,594,730 B1 | 3/2020 | Summers |
| 10,599,459 B2 | 3/2020 | Livshits |
| 10,642,507 B2 | 5/2020 | Gupta et al. |
| 10,642,518 B1 | 5/2020 | Bezbaruah et al. |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,728,255 B2 | 7/2020 | Jindal et al. |
| 10,809,998 B2 | 10/2020 | Gopalapura Venkatesh et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 10,949,192 B2 | 3/2021 | Gopalapura Venkatesh |
| 10,963,182 B2 | 3/2021 | Blau et al. |
| 11,025,626 B1 | 6/2021 | Todd |
| 11,086,826 B2 | 8/2021 | Thummala |
| 11,106,447 B2 | 8/2021 | Gupta |
| 11,194,680 B2 | 12/2021 | Konka et al. |
| 11,218,418 B2 | 1/2022 | Gupta et al. |
| 11,281,484 B2 | 3/2022 | Bafna et al. |
| 11,288,239 B2 | 3/2022 | Bafna et al. |
| 11,294,777 B2 | 4/2022 | Venkatesh et al. |
| 11,310,286 B2 | 4/2022 | Cui et al. |
| 2001/0047400 A1 | 11/2001 | Coates |
| 2002/0069196 A1 | 6/2002 | Betros |
| 2002/0120763 A1* | 8/2002 | Miloushev .......... H04L 67/1023 709/230 |
| 2002/0133491 A1 | 9/2002 | Sim et al. |
| 2003/0014442 A1 | 1/2003 | Shiigi |
| 2003/0115218 A1 | 6/2003 | Bobbitt et al. |
| 2003/0163597 A1 | 8/2003 | Hellman et al. |
| 2003/0195942 A1 | 10/2003 | Muhlestein et al. |
| 2004/0054777 A1 | 3/2004 | Ackaouy et al. |
| 2004/0199734 A1 | 10/2004 | Rajamani |
| 2004/0210591 A1 | 10/2004 | Hirschfeld et al. |
| 2004/0225742 A1 | 11/2004 | Loaiza |
| 2004/0267832 A1 | 12/2004 | Wong et al. |
| 2005/0094574 A1 | 5/2005 | Han et al. |
| 2005/0120160 A1 | 6/2005 | Plouffe et al. |
| 2005/0120180 A1 | 6/2005 | Schornbach et al. |
| 2005/0125503 A1 | 6/2005 | Iyengar et al. |
| 2005/0193221 A1 | 9/2005 | Yoneyama |
| 2005/0193245 A1 | 9/2005 | Hayden et al. |
| 2005/0201272 A1 | 9/2005 | Wang et al. |
| 2005/0210461 A1 | 9/2005 | Srivastava et al. |
| 2005/0226059 A1 | 10/2005 | Kavuri et al. |
| 2005/0228798 A1 | 10/2005 | Shepard et al. |
| 2005/0268298 A1 | 12/2005 | Hunt et al. |
| 2006/0010227 A1 | 1/2006 | Atluri |
| 2006/0047685 A1 | 3/2006 | Dearing et al. |
| 2006/0069912 A1 | 3/2006 | Zheng et al. |
| 2006/0080445 A1 | 4/2006 | Chang |
| 2006/0080657 A1 | 4/2006 | Goodman |
| 2006/0136781 A1 | 6/2006 | Lamport |
| 2006/0167921 A1 | 7/2006 | Grebus |
| 2006/0206901 A1 | 9/2006 | Chan |
| 2006/0224918 A1* | 10/2006 | Koike ................. G06F 11/2097 714/11 |
| 2006/0225065 A1 | 10/2006 | Chandhok et al. |
| 2006/0271510 A1 | 11/2006 | Harward |
| 2006/0271931 A1 | 11/2006 | Harris |
| 2007/0022129 A1 | 1/2007 | Bahar et al. |
| 2007/0038913 A1 | 2/2007 | Allen et al. |
| 2007/0100905 A1 | 5/2007 | Masters et al. |
| 2007/0171921 A1 | 7/2007 | Wookey et al. |
| 2007/0179995 A1 | 8/2007 | Prahlad |
| 2007/0271561 A1 | 11/2007 | Winner et al. |
| 2007/0300220 A1 | 12/2007 | Seliger et al. |
| 2008/0040483 A1 | 2/2008 | Nakatani |
| 2008/0071997 A1 | 3/2008 | Loaiza |
| 2008/0098194 A1 | 4/2008 | Hashimoto et al. |
| 2008/0104349 A1 | 5/2008 | Maruyama |
| 2008/0104589 A1 | 5/2008 | Mccrory et al. |
| 2008/0133486 A1 | 6/2008 | Fitzgerald et al. |
| 2008/0134178 A1 | 6/2008 | Fitzgerald et al. |
| 2008/0189468 A1 | 8/2008 | Schmidt et al. |
| 2008/0201414 A1 | 8/2008 | Amir et al. |
| 2008/0201457 A1 | 8/2008 | London |
| 2008/0208938 A1 | 8/2008 | Lin et al. |
| 2008/0263113 A1 | 10/2008 | Krishnaiyer |
| 2008/0270677 A1 | 10/2008 | Kolakowski |
| 2008/0320499 A1 | 12/2008 | Suit |
| 2008/0320583 A1 | 12/2008 | Sharma et al. |
| 2009/0006801 A1 | 1/2009 | Shultz et al. |
| 2009/0100248 A1 | 4/2009 | Kami |
| 2009/0113034 A1 | 4/2009 | Krishnappa et al. |
| 2009/0144720 A1 | 6/2009 | Roush et al. |
| 2009/0150885 A1 | 6/2009 | Safari |
| 2009/0158082 A1 | 6/2009 | Jain et al. |
| 2009/0171971 A1 | 7/2009 | Goddard et al. |
| 2009/0193272 A1 | 7/2009 | Matsuzawa et al. |
| 2009/0216975 A1 | 8/2009 | Halperin et al. |
| 2009/0248870 A1 | 10/2009 | Kamei et al. |
| 2009/0249470 A1 | 10/2009 | Litvin et al. |
| 2009/0254572 A1 | 10/2009 | Redlich |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2009/0290572 A1 | 11/2009 | Gonia et al. |
| 2010/0023521 A1 | 1/2010 | Arcese |
| 2010/0042869 A1 | 2/2010 | Szabo et al. |
| 2010/0070725 A1 | 3/2010 | Prahlad et al. |
| 2010/0082716 A1 | 4/2010 | Agetsuma et al. |
| 2010/0082774 A1 | 4/2010 | Pitts |
| 2010/0095289 A1 | 4/2010 | Nguyen et al. |
| 2010/0050944 A1 | 5/2010 | Callahan |
| 2010/0110150 A1 | 5/2010 | Xu et al. |
| 2010/0138921 A1* | 6/2010 | Na ..................... H04L 63/1458 726/22 |
| 2010/0162226 A1 | 6/2010 | Borissov et al. |
| 2010/0174745 A1 | 7/2010 | Ryan et al. |
| 2010/0214908 A1* | 8/2010 | Ralev ................. G06F 11/2025 370/221 |
| 2010/0241785 A1 | 9/2010 | Chen et al. |
| 2010/0250824 A1 | 9/2010 | Belay |
| 2010/0262717 A1 | 10/2010 | Critchley |
| 2010/0275205 A1 | 10/2010 | Nakajima |
| 2010/0306256 A1 | 12/2010 | Blackman |
| 2011/0022694 A1 | 1/2011 | Dalal et al. |
| 2011/0022695 A1 | 1/2011 | Dalal et al. |
| 2011/0022812 A1 | 1/2011 | Van Der L. et al. |
| 2011/0022883 A1 | 1/2011 | Hansen |
| 2011/0047340 A1 | 2/2011 | Olson et al. |
| 2011/0078318 A1 | 3/2011 | Desai et al. |
| 2011/0107135 A1 | 5/2011 | Andrews et al. |
| 2011/0119668 A1 | 5/2011 | Calder |
| 2011/0119763 A1 | 5/2011 | Wade et al. |
| 2011/0125835 A1 | 5/2011 | Soltis |
| 2011/0137879 A1 | 6/2011 | Dubey |
| 2011/0145627 A1 | 6/2011 | Huras et al. |
| 2011/0161299 A1 | 6/2011 | Prahlad et al. |
| 2011/0173493 A1 | 7/2011 | Armstrong et al. |
| 2011/0179414 A1 | 7/2011 | Goggin et al. |
| 2011/0184993 A1 | 7/2011 | Chawla et al. |
| 2011/0185292 A1 | 7/2011 | Chawla et al. |
| 2011/0225574 A1 | 9/2011 | Khalidi et al. |
| 2011/0239213 A1 | 9/2011 | Aswan et al. |
| 2011/0251992 A1 | 10/2011 | Bethlehem |
| 2011/0252208 A1 | 10/2011 | Ali et al. |
| 2011/0255538 A1 | 10/2011 | Srinivasan et al. |

(56) References Cited

U.S. PATENT DOCUMENTS

| | | |
|---|---|---|
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0307729 A1 | 12/2011 | Matsuzawa et al. |
| 2011/0320690 A1 | 12/2011 | Petersen et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054736 A1 | 3/2012 | Arcese et al. |
| 2012/0078948 A1 | 3/2012 | Darcy |
| 2012/0081395 A1 | 4/2012 | Adi et al. |
| 2012/0084381 A1 | 4/2012 | Alladi et al. |
| 2012/0117555 A1 | 5/2012 | Banerjee et al. |
| 2012/0126177 A1 | 5/2012 | Meissner et al. |
| 2012/0166866 A1* | 6/2012 | Rao .............. G06F 11/1425 714/4.12 |
| 2012/0209983 A1 | 8/2012 | Bronner |
| 2012/0222089 A1 | 8/2012 | Whelan et al. |
| 2012/0233463 A1* | 9/2012 | Holt .............. G06F 3/0608 713/168 |
| 2012/0233608 A1 | 9/2012 | Toeroe |
| 2012/0243795 A1 | 9/2012 | Head et al. |
| 2012/0254342 A1 | 10/2012 | Evans |
| 2012/0254445 A1 | 10/2012 | Kawamoto et al. |
| 2012/0254567 A1 | 10/2012 | Umbehocker |
| 2012/0266162 A1 | 10/2012 | Baron |
| 2012/0266231 A1 | 10/2012 | Spiers et al. |
| 2012/0272237 A1 | 10/2012 | Baron |
| 2012/0290630 A1 | 11/2012 | Aizman et al. |
| 2012/0304247 A1 | 11/2012 | Badger |
| 2012/0310881 A1 | 12/2012 | Shadmon |
| 2012/0310892 A1 | 12/2012 | Dam et al. |
| 2012/0317142 A1 | 12/2012 | Broecheler et al. |
| 2012/0324183 A1 | 12/2012 | Chiruvolu et al. |
| 2013/0007741 A1 | 1/2013 | Britsch et al. |
| 2013/0036323 A1 | 2/2013 | Goose et al. |
| 2013/0046740 A1 | 2/2013 | Li et al. |
| 2013/0047160 A1 | 2/2013 | Conover |
| 2013/0054973 A1 | 2/2013 | Fok et al. |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0138995 A1 | 5/2013 | Sivaramakrishnan et al. |
| 2013/0151888 A1 | 6/2013 | Bhattiprolu et al. |
| 2013/0152077 A1 | 6/2013 | Leitman et al. |
| 2013/0152085 A1 | 6/2013 | D, Amore et al. |
| 2013/0174246 A1 | 7/2013 | Schrecker et al. |
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0219030 A1 | 8/2013 | Szabo |
| 2013/0227379 A1 | 8/2013 | Gupta et al. |
| 2013/0227550 A1 | 8/2013 | Weinstein et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0235774 A1 | 9/2013 | Jo et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0283267 A1 | 10/2013 | Cooper et al. |
| 2013/0297869 A1 | 11/2013 | Mills et al. |
| 2013/0304694 A1 | 11/2013 | Barreto et al. |
| 2013/0332771 A1 | 12/2013 | Salapura et al. |
| 2014/0006708 A1 | 1/2014 | Huynh et al. |
| 2014/0025796 A1 | 1/2014 | Vibhor et al. |
| 2014/0052877 A1 | 2/2014 | Mao |
| 2014/0059392 A1 | 2/2014 | Ren et al. |
| 2014/0068612 A1 | 3/2014 | Torrey |
| 2014/0068711 A1 | 3/2014 | Schweitzer, III et al. |
| 2014/0075029 A1 | 3/2014 | Lipchuk et al. |
| 2014/0089259 A1 | 3/2014 | Cheng |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0101649 A1 | 4/2014 | Kamble |
| 2014/0108587 A1 | 4/2014 | Goldberg |
| 2014/0109172 A1 | 4/2014 | Barton et al. |
| 2014/0115182 A1 | 4/2014 | Sabaa et al. |
| 2014/0123138 A1 | 5/2014 | Lee et al. |
| 2014/0143831 A1 | 5/2014 | Fieweger |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0164831 A1 | 6/2014 | Merriman et al. |
| 2014/0173199 A1 | 6/2014 | Gupta et al. |
| 2014/0181116 A1 | 6/2014 | Wang |
| 2014/0188808 A1 | 7/2014 | Wolf et al. |
| 2014/0189429 A1 | 7/2014 | Gill |
| 2014/0189677 A1 | 7/2014 | Curzi |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0222953 A1 | 8/2014 | Karve et al. |
| 2014/0230024 A1 | 8/2014 | Uehara et al. |
| 2014/0237464 A1 | 8/2014 | Waterman et al. |
| 2014/0245387 A1 | 8/2014 | Colpo et al. |
| 2014/0250300 A1 | 9/2014 | Runkis et al. |
| 2014/0279909 A1 | 9/2014 | Sudarsanam et al. |
| 2014/0298185 A1 | 10/2014 | Chen |
| 2014/0310710 A1 | 10/2014 | Lubsey et al. |
| 2014/0359612 A1 | 12/2014 | D'Amato et al. |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032653 A1 | 1/2015 | Lyer et al. |
| 2015/0032690 A1 | 1/2015 | Hoque et al. |
| 2015/0039735 A1 | 2/2015 | Zeyliger |
| 2015/0039763 A1 | 2/2015 | Chaudhary et al. |
| 2015/0039837 A1 | 2/2015 | Quan et al. |
| 2015/0058298 A1 | 2/2015 | Earl et al. |
| 2015/0081644 A1 | 3/2015 | Pitts |
| 2015/0095788 A1 | 4/2015 | Thiele et al. |
| 2015/0106325 A1 | 4/2015 | Cole et al. |
| 2015/0106802 A1 | 4/2015 | Ivanov et al. |
| 2015/0142745 A1 | 5/2015 | Tekade et al. |
| 2015/0142747 A1 | 5/2015 | Zou |
| 2015/0143164 A1 | 5/2015 | Veerla |
| 2015/0172412 A1 | 6/2015 | Escriva |
| 2015/0178019 A1 | 6/2015 | Hegdal et al. |
| 2015/0205618 A1 | 7/2015 | Bailey et al. |
| 2015/0205639 A1 | 7/2015 | Matsumoto et al. |
| 2015/0213032 A1 | 7/2015 | Powfil et al. |
| 2015/0220324 A1 | 8/2015 | Arcese et al. |
| 2015/0242291 A1 | 8/2015 | Chang et al. |
| 2015/0244802 A1 | 8/2015 | Simoncelli |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0347775 A1 | 12/2015 | Bie et al. |
| 2015/0355862 A1 | 12/2015 | Hayes |
| 2015/0378761 A1 | 12/2015 | Sevigny |
| 2015/0378853 A1 | 12/2015 | Sevigny |
| 2016/0011898 A1 | 1/2016 | Lee |
| 2016/0018446 A1 | 2/2016 | Bondurant |
| 2016/0034555 A1 | 2/2016 | Rahut et al. |
| 2016/0050118 A1 | 2/2016 | Blanco et al. |
| 2016/0057009 A1 | 2/2016 | Kadayam et al. |
| 2016/0070492 A1 | 3/2016 | Cherubini et al. |
| 2016/0077936 A1 | 3/2016 | Tang et al. |
| 2016/0077988 A1 | 3/2016 | Tipton |
| 2016/0078068 A1 | 3/2016 | Agrawal et al. |

(56) References Cited

U.S. PATENT DOCUMENTS

| | | |
|---|---|---|
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179416 A1 | 6/2016 | Mutha |
| 2016/0179419 A1 | 6/2016 | Yamaguchi et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0204977 A1 | 7/2016 | Cui et al. |
| 2016/0216993 A1 | 7/2016 | Beckwith et al. |
| 2016/0224363 A1 | 8/2016 | Joy |
| 2016/0274926 A1 | 9/2016 | Narasimhamurthy |
| 2016/0301766 A1* | 10/2016 | Ionescu ............... G06F 16/172 |
| 2016/0316003 A1 | 10/2016 | Snider |
| 2016/0328226 A1 | 11/2016 | Arya et al. |
| 2016/0335134 A1 | 11/2016 | Gupta et al. |
| 2016/0359697 A1 | 12/2016 | Scheib et al. |
| 2016/0359955 A1 | 12/2016 | Gill et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0094002 A1 | 3/2017 | Kumar et al. |
| 2017/0109184 A1 | 4/2017 | Ramani et al. |
| 2017/0160983 A1 | 6/2017 | Fiske et al. |
| 2017/0177638 A1 | 6/2017 | Bhosale et al. |
| 2017/0193021 A1 | 7/2017 | Deng |
| 2017/0206074 A1 | 7/2017 | Arcese et al. |
| 2017/0206207 A1 | 7/2017 | Bondurant et al. |
| 2017/0214738 A1 | 7/2017 | Agarwal et al. |
| 2017/0220661 A1 | 8/2017 | Cao et al. |
| 2017/0228300 A1 | 8/2017 | Thomas |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Gopalapura Venkatesh et al. |
| 2017/0235764 A1 | 8/2017 | Sharpe et al. |
| 2017/0235950 A1 | 8/2017 | Gopalapura Venkatesh et al. |
| 2017/0242599 A1 | 8/2017 | Patnaik et al. |
| 2017/0262346 A1 | 9/2017 | Pradhan et al. |
| 2017/0264684 A1 | 9/2017 | Spillane |
| 2017/0277556 A1 | 9/2017 | Ishii et al. |
| 2017/0277903 A1 | 9/2017 | Christodorescu et al. |
| 2017/0279674 A1* | 9/2017 | Zhu ..................... H04L 41/0806 |
| 2017/0286228 A1 | 10/2017 | Redko et al. |
| 2017/0302589 A1 | 10/2017 | Leafe et al. |
| 2017/0302731 A1 | 10/2017 | Cui |
| 2018/0004766 A1 | 1/2018 | Darling |
| 2018/0014650 A1 | 1/2018 | Tao |
| 2018/0062993 A1 | 3/2018 | Wu et al. |
| 2018/0129426 A1 | 5/2018 | Aron et al. |
| 2018/0143845 A1 | 5/2018 | Chawla et al. |
| 2018/0145960 A1 | 5/2018 | Bakshan |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0196719 A1 | 7/2018 | Glass |
| 2018/0205787 A1 | 7/2018 | Ben Dayan et al. |
| 2018/0278602 A1 | 9/2018 | Koushik et al. |
| 2018/0332105 A1 | 11/2018 | Huang et al. |
| 2018/0357251 A1 | 12/2018 | Kumarasamy et al. |
| 2019/0026101 A1 | 1/2019 | Gopalapura Venkatesh et al. |
| 2019/0034240 A1 | 1/2019 | Nabi |
| 2019/0079747 A1 | 3/2019 | Sinha et al. |
| 2019/0129808 A1 | 5/2019 | Acharya et al. |
| 2019/0196718 A1* | 6/2019 | Pai ........................ G06F 3/065 |
| 2019/0207925 A1 | 7/2019 | Anantha Padmanaban et al. |
| 2019/0286832 A1 | 9/2019 | Szeto et al. |
| 2019/0332683 A1 | 10/2019 | Thummala et al. |
| 2019/0339883 A1 | 11/2019 | Aron |
| 2020/0007530 A1* | 1/2020 | Mohamad Abdul ........................ H04W 12/0804 |
| 2020/0034069 A1 | 1/2020 | Batra |
| 2020/0036647 A1* | 1/2020 | Gupta ..................... H04L 67/42 |
| 2020/0081704 A1 | 3/2020 | Bafna et al. |
| 2020/0081733 A1 | 3/2020 | Buck |
| 2020/0106669 A1 | 4/2020 | Dhillon et al. |
| 2020/0125580 A1 | 4/2020 | Shao |
| 2020/0137157 A1 | 4/2020 | Joseph |
| 2020/0274869 A1 | 8/2020 | Tahenakos et al. |
| 2021/0081432 A1 | 3/2021 | Grunwald et al. |
| 2021/0141630 A1 | 5/2021 | Sharpe |
| 2021/0165759 A1 | 6/2021 | Bar-Nissan et al. |
| 2021/0200641 A1 | 7/2021 | Bafna |
| 2021/0224233 A1 | 7/2021 | Bafna |
| 2021/0247973 A1 | 8/2021 | Gupta |
| 2021/0334178 A1 | 10/2021 | Yang |
| 2021/0344772 A1 | 11/2021 | Arikatla |
| 2021/0349859 A1 | 11/2021 | Bafna |
| 2021/0365257 A1 | 11/2021 | Gopalapura Venkatesh |
| 2021/0390080 A1 | 12/2021 | Tripathi |
| 2021/0397587 A1 | 12/2021 | Thummala |
| 2021/0406136 A1 | 12/2021 | Venkatesh |
| 2022/0004377 A1 | 1/2022 | Sharpe |
| 2022/0147342 A1 | 5/2022 | Sharpe et al. |
| 2022/0147495 A1 | 5/2022 | Sharpe et al. |
| 2022/0156107 A1 | 5/2022 | Bafna et al. |

FOREIGN PATENT DOCUMENTS

| | | |
|---|---|---|
| CN | 110516005 | 11/2019 |
| CN | 110519112 A * | 11/2019 |
| CN | 110569269 | 12/2019 |
| EP | 1 229 443 A2 | 8/2002 |
| EP | 1062581 | 10/2003 |
| EP | 1214663 B1 | 6/2006 |
| EP | 1979814 A2 | 10/2008 |
| WO | WO 2010050944 | 5/2010 |
| WO | WO 2011078646 A1 | 6/2011 |
| WO | WO 2012126177 | 9/2012 |
| WO | WO 2014200564 A1 | 12/2014 |
| WO | WO 2016018446 | 2/2016 |
| WO | WO 2018014650 | 1/2018 |
| WO | WO 2020180291 A1 | 9/2020 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(56) References Cited

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Dell: "High Availability and Data Protection With Dell EMC ISILON Scale-Out NAS", (Jul. 2018), Dell Inc., pp. all.
JCosta et al., "High Availability Setup Using Veritas Cluster Server and NetApp Synchronous SnapMirror—One button Failover-Failback with SnapMirror Sync and Veritas Cluster Server", (Nov. 18, 2010), NetApp Community, pp. all.
NetApp: "Preparing storage systems for SnapMirror replication", (Jul. 2015), NetApp, Inc., pp. all.
Bounds, J., "High-Availability (HA) Pair Controller Configuration Overview and Best Practices", (Feb. 2016), NetApp, Inc., pp. all.
Cano, I. et al., "Curator: Self-Managing Storage for Enterprise Clusters", *14th USENIX Symposium on Networked Systems Design and Implementation*, NSDI '17, (Mar. 27, 2017).
NETAPP, "Clustered Data ONTAP 8.2 File Access Management Guide for CIFS", NetApp, Inc., (Feb. 2014).
Jung, Y. et al. "Standard-based Virtual Infrastructure Resource Management for Distributed and Heterogeneous Servers", ICACT, (Feb. 15, 2009).
Dell EMC, "Dell EMC Isilon OneFS Operating System, Scale-out NAS to maximize the data capital and business value of your unstructured data", Data Sheet, (Jan. 31, 2019), date retrieved from google.
Dell EMC, "Dell EMC Isilon OneFS Operating System, Powering the Isilon Scale-Out Storage Platform", White Paper, (Dec. 2019).
EMC, "EMC Isilon OneFS Operating System, Powering scale-out storage for the new world of Big Data in the enterprise", Data Sheet, (Apr. 2013).
EMC, Isilon OneFS, Version 8.0.1, Web Administration Guide, EMC Corporation, (Oct. 2016).
NetApp, "Enabling or disabling SMB automatic node referrals", ONTAP 9 Documentation Center, NetApp, Inc., (Updated Dec. 2020), from https://dos.netapp.com.ontap-9/index.jsp?topic=%2Fcom.netapp.doc.cdot.famg-cifs%2FGUID.AC7E8515-3A4C-4BB5-A8C8-38B565SC952E0.html.
NetApp, "Guaranteeing throughput with QoS", ONTAP 9 Documentation Center, NetApp, Inc., (Updated Dec. 2020), from https://docs.netapp.com/ontap-9/index.jsp?topic=%2Fcom.netapp.doc.pow-perf-mon%2FGUID-77DF9BAF-4ED7-43F6-AECE-95DFB0680D2F.html.
NetApp. "How to troubleshoot the 'Autolocation' feature in Clustered Data ONTAP", Knowledgebase, NetApp, (Jun. 4, 2019).
NetApp. "How to troubleshoot the 'Autolocation' feature in Clustered Data ONTAP—Results", Knowledgebase, NetApp, (Captured on Sep. 19, 2019).
Cloudian, "Hybrid Cloud Storage with Cloudian HyperStore and Amazon S3", Solution Brief, Cloudian Inc., (Aug. 2015).
Netapp, "Improving client response time by providing SMB automatic node referrals with Auto Location", NetApp, Inc., (May 2013), from https://library.netapp.com/ecmdocs/ECMP1196891/html/GUID-0A5772A4-A6D7-4A00-AC2A-92B868C5B3B5.html.
NetApp, "Managing Workloads", ONTAP 9 Documentation Center, NetApp, Inc., (Updated Dec. 2020), from https://docs.netapp.com/ontap9/index.jsp?topic=%2Fcom.netapp.doc.pow-perf-mon%2FGUID-13D35FC5-AF37-4BBD-8A8E-B10B41451A16.html.
Nutanix, "Nutanix AFS—Introduction & Steps for Setting up", (Jan. 3, 2018), from https://virtual building blocks. com/2018/01/03/nutanix-afs-introduction-steps-for-setting-up/.
NetApp, "Protect Your Data with NetApp Element Software", Solution Brief, NetApp, (Oct. 11, 2020), date retrieved from google.
Kemp, E., "NetApp SolidFire SnapMirror Architecture and Configuration", Technical Report, NetApp, (Dec. 2017).
Kifyman, B., "How Cloud Computing Changes Storage Tiering", DataCenter Knowledge, (Nov. 12, 2015).
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Mizrak, A. T. et al., "VMware vCENTER Server High Availability Performance and Best Practices", VMware vCenter Server 6.5, Performance Study, VMware, (Nov. 2016).
Virtuadmin, "Configure vCENTER High Availability", Virtubytes, (Sep. 14, 2017).
U.S. Appl. No. 17/129,425 titled "Parallel Change File Tracking in a Distributed File Server Virtual Machine (FSVM) Architecture" filed Dec. 21, 2020.
U.S. Appl. No. 16/942,929 titled "Method Using Access Information in a Distributed File Server Virtual Machine (FSVM) Architecture, Including Web Access"; filed Jul. 30, 2020.
U.S. Appl. No. 16/944,323 titled "Actions Based on File Tagging in a Distributed File Server Virtual Machine (FSVM) Environment", filed Jul. 31, 2020.
U.S. Appl. No. 17/091,758 titled "Virtualized File Server Distribution Across Clusters", filed Nov. 6, 2020.
Non-final Office Action dated Jul. 7, 2015 for related U.S. Appl. No. 14/278,363.
Non-final Office Action dated Jul. 16, 2015 for related U.S. Appl. No. 14/584,466.
International Search Report and Written Opinion dated Aug. 20, 2015, for related PCT Patent Application No. PCT/US15/31096, 8 pages.
International Search Report and Written Opinion dated Aug. 26, 2015, for related PCT Patent Application No. PCT/US15/31096, 8 pages.
Final Office Action dated Feb. 25, 2016 for related U.S. Appl. No. 14/584,466.
Final Office Action dated Mar. 23, 2016 for related U.S. Appl. No. 14/278,363.
Notice Of Allowance and Fee(s) due dated Jul. 19, 2016 for related U.S. Appl. No. 14/206,869.
Lamport, Leslie "Paxos Made Simple," dated Nov. 1, 2001, 14 pages.
Alexander Shraer, et al., "Dynamic Reconfiguration of Primary/Backup Clusters," dated 2011, 13 pages.
Notice of Allowance and Fee(s) due dated Oct. 30, 2015 for related U.S. Appl. No. 14/144,520.
Wikipedia, "Compare-and-swap," Nov. 9, 2015, 6 pages.
International Search Report and Written Opinion dated Aug. 7, 2015, for corresponding PCT Patent Application No. PCT/US2015/030026, 10 pages.

(56) References Cited

OTHER PUBLICATIONS

Non-final Office Action dated Jul. 17, 2015 for related U.S. Appl. No. 14/206,869.
PCT International Search Report and Written Opinion dated Jun. 15, 2015 for related PCT Patent Application No. PCT/US2015/020139.
Final Office Action dated Jan. 25, 2016 for related U.S. Appl. No. 14/206,869.
Non-final Office Action dated Sep. 22, 2016 for related U.S. Appl. No. 14/584,466.
Citrix, "Citrix XenServer 6.0 Administrator's Guide", Copyright 2012 Citrix Systems, Inc., 207 pages (PCM Nutanix-023 ref).
John L Hufferd, Hufferd Enterprises, SNIA, "IP Storage Protocols: iSCSI", Copyright 2011 Storage Networking Industry Association, 46 pages (PCM Nutanix-032 ref).
VMware, Technical White Paper, "Multipathing Configuration for Software iSCSI Using Port Binding", Copyright 2012 Vmware, Inc., 15 pages (PCM Nutanix-032 ref).
Non-final Office Action dated Oct. 7, 2016 for related U.S. Appl. No. 14/278,363.
Notice of Allowance and Fee(s) due dated Oct. 24, 2016 for related U.S. Appl. No. 14/206,869.
Non-final Office Action dated Nov. 1, 2016 for related U.S. Appl. No. 14/708,091.
Notice of Allowance and Fee(s) due dated Apr. 5, 2017 for related U.S. Appl. No. 14/584,466.
Ajmani et al., "Scheduling and Simulation: How to Upgrade Distributed Systems," HotOS IX: The 9th Workshop on Hot Topics in Operating Systems, USENIX, 2003, pp. 43-48.
Kochut, Andrzej and Alexei Karve, "Leveraging Local Image Redundancy for Efficient Virtual Machine Provisioning," 2012 1EEE Network Operations and Management Symposium, Jun. 8, 2012, pp. 179-187.
Soules et al.; "Metadata Efficiency in a Comprehensive Versioning File System", May 2002, CMU-CS-02-145, School of Computer Science, Carnegie Mellon University, Pittsburgh, PA 15213, 33 pages.
Notice of Allowance and Fee(s) due dated Apr. 10, 2017 for related U.S. Appl. No. 14/278,363.
Final Office Action dated Apr. 20, 2017 for related U.S. Appl. No. 14/708,091.
Notice of Allowance and Fee(s) due dated May 15, 2017 for related U.S. Appl. No. 15/069,961.
Non-Final Office Action dated Jan. 26, 2017 for related U.S. Appl. No. 15/069,961.
Non-Final Office Action dated Jul. 12, 2017 for related U.S. Appl. No. 14/610,285.
European Search Report dated May 5, 2017 for related EP Application No. 15792334.3, 13 pages.
European Search Report dated May 19, 2017 for related EP Application No. 15788922.1, 11 pages.
Non-Final Office Action dated Aug. 24, 2017 for related U.S. Appl. No. 14/708,091.
Final Office Action dated Jan. 9, 2018 for related U.S. Appl. No. 14/610,285.
European Extended Search Report dated Jan. 15, 2018 for related EP Application No. 15762234.1, 19 pages.
Final Office Action dated Feb. 27, 2018 for related U.S. Appl. No. 14/708,091.
Advisory Action dated May 18, 2018 for related U.S. Appl. No. 14/708,091.
Non-Final Office Action dated Jun. 7, 2018 for related U.S. Appl. No. 15/294,422.
Non-Final Office Action dated Jun. 29, 2018 for related U.S. Appl. No. 15/160,347.
Notice of Allowance dated Sep. 6, 2018 for related U.S. Appl. No. 14/708,091, 8 pages.
First Office Action dated Jul. 30, 2018 for related European Application No. 15762234.1, 6 pages.
Non-Final Office Action dated Nov. 14, 2018 for related U.S. Appl. No. 15/678,893, 7 pages.

Notice of Allowance dated Nov. 20, 2018 for related U.S. Appl. No. 15/294,422, 7 pages.
Intention to Grant dated Jan. 3, 2019 for related EP Application No. 15792334.3, 7 pages.
Final Office Action dated Jan. 28, 2019 for related U.S. Appl. No. 15/160,347, 16 pages.
Notice of Allowance dated Mar. 20, 2019 for related U.S. Appl. No. 15/678,893, 5 pages.
Notice of Allowance dated Mar. 26, 2019 for related U.S. Appl. No. 15/294,422, 7 pages.
Non-Final Office Action dated Sep. 6, 2019 for related U.S. Appl. No. 15/160,347.
Notice of Allowance dated Nov. 19, 2019 for related U.S. Appl. No. 14/708,091.
Notice of Allowance dated Dec. 27, 2019 for related U.S. Appl. No. 14/610,285.
Final Office Action dated Mar. 16, 2020 for related U.S. Appl. No. 15/160,347.
E.S., "Nutanix Two-Node Clusters", (Jun. 18, 2018), from http://vpash.com/nutanix/nutanix-two-node-clusters/, pp. all.
Configuring a Witness (two-node cluster) (Jul. 16, 2018), 3 pages.
Gupta, Upasna. "Unlocking the ROBO/Edge IT Landscape with the Launch of Nutanix 1-node Cluster" (Jan. 19, 2018), 7 pages.
Liu, M. "Fine-Grained Replicated State Machines for a Cluster Storage System", in the Proceedings of the 17th USENIX Symposium on Networked Systems Design and Implementation (NSDI '20), (Feb. 25-27, 2020).
Junqueira, F. P., "Zab: High-performance broadcast for primary-backup systems", 2011 IHEE/IFIP 41st International Conference on Dependable Systems & Networks (DSN), (Jun. 27-30, 2011).
Redis, "Redis Sentinel Documentation", (Jul. 23, 2012), date retrieved from google.
RABBITMQ, "Quorum Queues", (Nov. 14, 2019), date retrieved from google.
Cao, W.,"PolarFS: An Ultra-low Latency and Failure Resilient Distributed File System for Shared Storage Cloud Database", Proceedings of the VLDB Endowment, vol. 11, No. 12, (Aug. 2018).
Alibaba Cloud, "AliSQL X-Cluster: An MySQL Database with Superior Performance and Strong Consistency", (Dec. 8, 2019).
Final Office Action dated Aug. 5, 2020 for U.S. Appl. No. 16/041,348.
Notice of Allowance dated Nov. 4, 2020 for related U.S. Appl. No. 15/160,347.
VMware, "vSAN Planning and Deployment", VMware vSphere 7.0, VMware vSAN 7.0, VMware, Inc., (Apr. 2, 2020).
VMware, "VMware Infrastructure, Automating High Availability (HA) Services with VMware HA", VMware Technical Note, (Revised on Jun. 5, 2006).
VMware, "VMware® High Availability (VMware HA): Deployment Best Practices", VMware® vSphere™ 4.1, Technical White Paper, (Dec. 10, 2010), date retrieved from google.
Potheri, M. et al., "VMware vCenter Server™ 6.0, Availability Guide", Technical Marketing Documentation, Version 1.0, (May 2015).
McCarty, J., "VMware® Virtual SAN™ Stretched Cluster: Bandwidth Sizing Guidance", Technical White Paper, VMware, (Jan. 26, 2016), date retrieved from google.
McCarty, J., "VMware® Virtual SAN™ 6.1 Stretched Cluster & 2 Node Guide", Storage and Availability Business Unit, VMware, v 6.1.0c, version 0.20, (Jan. 2016).
Hogan, C., "VMware Virtual SAN Health Check Guide", Storage and Availability Business Unit, VMware, v 6.1.0, (Sep. 2015).
Notice of Allowance dated Mar. 3, 2021 for U.S. Appl. No. 16/041,348.
Notice of Allowance dated Mar. 10, 2021 for related U.S. Appl. No. 15/160,347.
Rivera, R., "VMware Virtual SAN: Witness Component Deployment Logic", VMware vSphere Bloi, (Apr. 1, 2014).
Page, M. "EMC Vplex Witness Deployment Within Vmware Vcloud Air", White Paper, EMC, (Oct. 7, 2016).
EMC, "EMC Vplex Witness Deployment Within Vmware Vcloud Air", White Paper, EMC, (Jul. 2013).
"New VMware HCL category: vSphere Metro Stretched Cluster", Virtual Geek, (Oct. 5, 2011).

(56) References Cited

OTHER PUBLICATIONS

Lakkapragada, S et al., "Site Recovery Manager and Stretched Storage: Tech Preview of a New Approach to Active-Active Data Centers", VMware, (Nov. 2014).
Epping, D., "Stretched vCloud Director Infrastructure", VMware, (Jan. 23, 2013).
Bernasconi, A et al., "IBM San and SVC Stretched Cluster and VMware Solution Implementation", IBM Redbooks, (Apr. 2013).
Ashish, S et al., "IBM San vol. Controller Stretched Cluster with PowerVM and PowerHA", IBM Redbooks, (Jul. 2013).
Dell, "Multi-AZ (stretched cluster)", Architecture Guide-VMware Cloud Foundation 3.10.01 on VxRail, Dell Technologies, (Oct. 2001).
Daveberm, "Step-By-Step: Configuring a 2-NODE Multi-Site Cluster On Windows Server 2008 R2 - PART 1", Clustering for Mere Mortals, (Sep. 15, 2009).
"Failover Clustering (III)", Networks & Servers Blog, (Sep. 2011).
Sarmiento, E., "Force Start a Windows Server Failover Cluster without a Quorum to bring a SQL Server Failover Clustered Instance Online", (Aug. 22, 2014).
Horenbeeck, M. V., "Spooky! the Curious Case of the 'Ghost' File Share Witness ... ", (Jul. 15, 2014).
VMware, "Administering VMware Virtual SAN: VMware vSphere 6.5, vSAN 6.6", VMware, (Jun. 26, 2017).
Littman, M. L., "The Witness Algorithm: Solving Partially Observable Markov Decision Process", Brown University, (Dec. 1994).
Oracle, "Deploying Microsoft SQL Server Always On Availability Groups", Oracle White Paper, (Sep. 2018).
EnterpriseDB, "EDB Failover Manager Guide: Failover Manager Version 2.0.3", EnterpriseDB Corporation, (Dec. 18, 2015).
"Explaining the Stormagic SvSAN WITNESS", White Paper, (Aug. 29, 2018).
"2016 Failover cluster using Azure blob as a cluster quorum", Teckadmin, (Mar. 31, 2019).
Deschner, G et al., "Calling the Witness: SMB3 Failover with Samba/CTDB", Redhat, (Oct. 2, 2015).
Microsoft, "High Availability Solutions: SQL Server 2012 Books Online", Microsoft (Jun. 2012).
Mitchell, D., "Introduction to VMware vSAN™ for VMware Cloud Providers ™," Version 2.9, VMware, (Jan. 2018).
Mitchell, D., "Introduction to VMware vSAN™ for VMware vCloud Air™ Network", Version 2.7, VMware, (Feb. 2017).
Paderin, M. "Analysis of Server Clustering Its Uses and Implementation", Bachelor's thesis Information Technology, (Dec. 2017).
VMware, "Virtualizing Microsoft Applications on VMware Virtual SAN", Reference Architecture, VMware, (Apr. 2, 2015).
Deschner, G., "Implementing the Witness protocol in Samba", Redhat, (Jun. 22, 2015).
Deschner, G., "Cluster improvements in Samba4", Redhat, (May 30, 2016).
Ngyuen, L., "Smb 3 Transparent Failover for Hitachi NAS Platform 4000 Series", Tech Note, Hitachi Data Systems, (Nov. 2016).
McCarty, J. Storage and Availability Business Unit, VMware (Jan. 2016), "VMware Virtual SAN 6.1 Stretched Cluster @ 2 Node Guide".
VMware, "VMware Horizon 6 with App vols. and Virtual SAN Reference Architecture", Technical White Paper, VMware, (Apr. 9, 2011), date retrieved from google.
Feroce, D., "Leveraging VMware vSAN™ for Highly Available Management Clusters", Version 2.9, VMware, (Jan. 2018).
VMware, "Deployment for Multiple Availability Zones", VMware Validated Design for Software-Defined Data Center 4.3, VMware, (Jul. 17, 2018).
Hogan, C., "VMware Virtual SAN Health Check Guide", Storage and Availability Business Unit, v 6.1.0, VMware, (Sep. 2015).
Banerjee, A. et al., "VMware Virtual SAN™ Stretched Cluster: Performance and Best Practices", Technical White Paper, VMware, (Oct. 22, 2015).
Hosken, M., "VMware vSAN™ Two-Node Architecture VMware Cloud Provider™ Use Cases", Version 2.9, VMware, (Jan. 2018).
"VMware Virtual SAN 6.2", Licensing Guide, VMware, (Revised Jun. 2016).
Hunter, J., "VMware Virtual SAN 6.2", Pci Dss Compliance Guide, (Revised Feb. 2016).
"VMware Virtual San: Sap Applications", Solution Overview, VMware, (May 6, 2016).
Eckerle, A et al., "What's New in VMware vSphere® 6.5", Technical White Paper, (Nov. 15, 2016).
Notice of Allowance dated Jun. 24, 2021 for related U.S. Appl. No. 16/041,348.
Notice of Allowance dated Aug. 4, 2021 for related U.S. Appl. No. 15/160,347.
Non-Final Office Action dated Aug. 5, 2021 for related U.S. Appl. No. 16/747,272.
Non-Final Office Action dated Feb. 4, 2020 for U.S. Appl. No. 16/041,348.
Final Office Action dated Apr. 26, 2021 for related U.S. Appl. No. 16/177,126.
Non-Final Office Action dated Sep. 7, 2021 for U.S. Appl. No. 16/947,444.
Notice of Allowance dated Dec. 8, 2021 for related U.S. Appl. No. 16/747,272.
Final Office Action dated Dec. 27, 2021 for U.S. Appl. No. 16/947,444.
"Setting up and Using Acropolis File Services (Afs) On Nutanix Aos 5.0"; Virtual Dennis - Sharing Technical Tips Learned the Hard Way; Posted Dec. 30, 2016; pp. all.
Bas van Kaam "New in Aos 5.0: Nutanix Acropolis File Services"; basvankaam.com; Jan. 5, 2017; pp. all.
Ruth, Paul "Autonomic Live Adaptation of Virtual Computational Environments in a Multi-Domain Infrastructure"; 2006 IEEE International Conference on Autonomic Computing, 2006, pp. 5-14.
Illingworth, T., "Enable or disable SMB automatic node referrals," dated Dec. 9, 2021, URL: https://docs.netapp.com/ontap-9/index.jsp?topic=%2Fcom.netapp.doc.cdot-famg-cifs%2FGUID-AC7E8515- 3A4C-4BB5-A8C8-38B565C952E0.html.
Administering VMware Virtual SAN; VMware vSphere 6.5; vSAN 6.6; https://docs.vmware.com/en/VMware-vSphere/6.5/virtual-san-66-administration-guide.pdf, captured Aug. 20, 2021.
Illingworth, T, "Guarantee throughput with QoS overview," dated Dec. 9, 2021, NetApp, URL: https://docs.netapp.com/ontap-9/index.jsp?topic=%2Fcom.netapp.doc.pow-perf-mon%2FGUID-77DF9BAF-4ED7-43F6-AECE-95DFB0680D2F.html.
"Manage workloads," NetApp, dated Oct. 14, 2021, URL: https://docs.netapp.com/ontap- 9/index.jsp?topic=%2Fcom.netapp.doc.pow-perf-mon%2FGUID-13D35FC5-AF37-4BBD-8A8E-B10B41451A16.html.
"Backup vSAN 7 File Share with Veeam Backup & Replication 10," Sysadmin Stories, dated Jun. 2, 2020, URL: https://www.sysadminstories.com/2020/06/backup-vsan-7-file-share-with-veeam.html.
VSphere Storage; Update 2; VMware vSphere 7.0; VMware ESXi 7.0; vCenter Server 7.0; dated Jun. 25, 2021 https://docs.vmware.com/en/VMware-vSphere/7.0/vsphere-esxi-vcenter-server-702-storage-guide.pdf.
VMWare Datasheet; https://www.vmware.com/content/dam/digitalmarketing/vmware/en/pdf/products/vCenter/vmware-vcenter-server-datasheet.pdf, captured Aug. 20, 2021.
"vSAN Health Service—File Service—File Server Health (77165)," VMware, Knowledge Base, dated Oct. 4, 2021, URL: https://kb.vmware.com/s/article/77165.
Update 3, VMWare vSphere 6.7; VMware vSAN 6.7; dated Aug. 20, 2019, https://docs.vmware.com/en/VMware-vSphere/6.7/vsan-673-planning-deployment-guide.pdf.
"vSAN Stretched Cluster Guide," VMwareStorage, dated Jun. 2020, https://images.core.vmware.com/sites/default/files/resource/vsan_stretched_cluster_guide_noindex.pdf.
"The Wonderful World of Distributed Systems and the Art of Metadata Management," Nutanix, Inc., dated Sep. 24, 2015, URL: https://www.nutanix.com/blog/the-wonderful-world-of-distributed-systems-and-metadata-management.
Fojta, T. "Quotas and Quota Policies in VMware Cloud Director," Tom Fojta's Blog, dated Nov. 6, 2020.

(56) References Cited

OTHER PUBLICATIONS

Fojta, T., "vSAN File Services with vCloud Director," Tom Fojta's Blog, dated Apr. 6, 2020.
Hogan, C., New updates from Nutanix—NOS 3.0 and NX-3000, dated Dec. 20, 2012, URL: https://cormachogan.com/2012/12/20/new-from-nutanix-nos-3-0-nx-3000/.
Leibovici, A., "Nutanix One-Click Upgrade now takes care of Firmware and Hypervisor too! ," myvirtualcloud.net, dated Jul. 31, 2014, URL: https://myvirtualcloud.net/nutanix-one-click-upgrade-now-takes-care-of-firmware-and-hypervisor-too/.
Rajendran, C, "Working with vSAN Health Checks," VMware vSan Virtual Blocks Blog, dated Jul. 18, 2019, URL: https://blogs.vmware.com/virtualblocks/2019/07/18/working-with-vsan-health-checks/.
Sturniolo, A., "VMware vSAN File Services and Veeam," Veeam Blog, dated Jul. 22, 2020, URL: https://www.veeam.com/blog/veeam-backup-vsan-file-services.html.
"Administering VMware vSAN, Update 1," VMWare, copyright 2020.
"Characteristics of a vSAN Cluster," VMWare, dated May 31, 2019.
"Native File Services for vSAN 7," CORMACHOGAN.COM, dated Mar. 11, 2020.
"Nutanix Files Guide," Nutanix, dated Sep. 14, 2018.
Birk, R., "Understanding vSAN Architecture Components ," VMWare, dated Feb. 28, 2018.
Seget, V., "VMWare vSAN 7 now with native file services and quotas," VMWare, dated May 1, 2020.
"VMWare vSAN 7.0 Release Notes," VMWare, dated Jun. 23, 2020.
Seget, V., "VMWare vSphere 7.0 and vSAN storage improvements," 4sysops, dated Apr. 1, 2020.
"VMWare vSphere VMFS Technical Overview and Best Practices," VMWare Technical White Paper, copyright 2012.
"Additional Use Cases and Support Using vSAN File Services," VMWare, copyright 2021.
VSphere Storage; Update 2; VMware vSphere 6.7; VMware ESXi 6.7; vCenter Server 6.7; dated Jan. 4, 2021.
VSphere Availibility, Update 1, VMWare, dated Jan. 11, 2019.
Screen captures from YouTube video clip entitled "Tech TopX: AHV One Click Upgrade," 13 pages, uploaded on Dec. 8, 2015 by user "Nutanix University". Retrieved from Internet: https://www.youtube.com/watch?v=3dALdzw6qZM.
"vSAN Performance Graphs in the vSphere Web Client," VMWare Knowledge Base, dated Nov. 9, 2020.
VSAN Monitoring and Troubleshooting, Update 1, VMWare vSphere 7.0, copyright 2020.
U.S. Appl. No. 17/443,009, titled "Scope-Based Distributed Lock Infrastructure for Virtualized File Server" filed Jul. 19, 2021, pp. all.
U.S. Appl. No. 17/580,555 titled "Virtualized File Server" filed Jan. 20, 2022.
U.S. Appl. No. 17/581,418 titled "File Server Managers and Systems for Managing Virtualized File Servers" filed Jan. 21, 2022.
U.S. Appl. No. 17/585,403 titled "Virtualized File Server Smart Data Ingestion" filed Jan. 27, 2022.
U.S. Appl. No. 17/648,796 titled "Virtualized Server Systems and Methods Including Scaling of File System Virtual Machines" filed Jan. 24, 2022.
Non-Final Office Action for U.S. Appl. No. 16/947,444 dated May 17, 2022.
Citrix XenDesktop 7.1 on Microsoft Hyper-V Server 2012 R2 on Nutanix Virtual Computing Platform, dated Jun. 25, 2014.
U.S. Appl. No. 17/866,225 titled Virtualized File Server Disaster Recovery filed Jul. 15, 2022.
U.S. Appl. No. 17/865,907 titled "Virtualized File Server Deployment" , filed Jul. 15, 2022.
Hemmes, J., et al., "Cacheable Decentralized Groups for Grid Resource Access Control," Technical Report Jun. 2006, Department of Computer Science and Engineering, University of Notre Dame, dated 2006.
Lye, B., "Implementing Windows Server 2008 File System Quotas," Redgate, dated Nov. 19, 2009.
"VSAN File Services," VMwareStorage, VMWare, dated May 2020.
"Virtual Disk Manager User's Guide," Virtual Disk Development Kit, VMWare, copyright 2008.
Non-Final Office Action for U.S. Appl. No. 17/646,480 dated Sep. 27, 2022.
Final Office Action for U.S. Appl. No. 17/646,480 dated Jan. 20, 2023.
Notice of Allowance for U.S. Appl. No. 16/947,444 dated Mar. 1, 2023.
Notice of Allowance for U.S. Appl. No. 16/947,444 dated Apr. 27, 2023.

\* cited by examiner

MANAGING HIGH-AVAILABILITY FILE SERVERS

FIELD

This disclosure relates to distributed computing systems, and more particularly to techniques for managing high-availability file servers.

BACKGROUND

As computing technologies have evolved, data has become more and more valuable. Accordingly, computer technologies have been developed that identify certain data to be "protected" so that it is accessible or available even in the presence of some disastrous event. For example, a backup system might be implemented to hold a copy of the data so that the copy can be accessed if the original data is damaged or destroyed (e.g., in a fire or computing system crash) or otherwise lost. Many variations of backup systems have been deployed. As an example, data comprising a hierarchy of files in a file system might be periodically written to some non-volatile storage (e.g., magnetic tape or other media) and stored at a second location so that the data can be restored if a disaster were to occur. This technique has the characteristic of requiring administrative intervention that incurs a relatively long "downtime" to restore the file system content from the backup media.

To address the long restore downtimes associated with such file system content, file systems are sometimes stored and managed in pairs of redundant file servers. Each of the file servers is often a dedicated computing entity (e.g., one or more workstations, one or more virtualized entities, etc.) that is configured to respond to requests for file access from various hosts, which hosts can be any computing entity in any location that is authorized to send and receive data to and from the file servers. By maintaining a redundancy between the pair of file servers, if one file server fails, then a second one of the redundant file servers can be consulted to access the file system content. The file server that failed can be brought back to an operational state (e.g., after remediation or replacement) and can then be synchronized with the second file server.

In certain situations, synchronous replication can be implemented at the two file servers. In synchronous replication, when a host machine issues a file input/output (I/O or IO) request to invoke a write to a first file server, the data of the write is written to the second file server before the first file server commits the write and acknowledges the write with the requesting host. As such, both the first file server and the second file server are always synchronized. However, in the event of a failure, for example, at the first file server, there is a certain period of time during which the file system content is unavailable while an administrator performs a cutover (e.g., failover) to the second file server. In computing environments that host mission critical applications or workloads, even moderately short periods of downtime (e.g., while an administrator performs a failover to the second file server) cannot be tolerated. These mission critical applications need to perform their mission critical tasks uninterrupted and without the need for administrative intervention.

Unfortunately, procedures for performing failovers from one file server to another redundant file server are deficient, at least with respect to providing uninterrupted availability of file system content. Specifically, such procedures involve manual administrator intervention, which results in at least some amount of time that the file system content is unavailable. Furthermore, certain portions of the data that comprises the file system content can be lost with some file server failover approaches. What is needed is a way to maintain lossless availability of file system content that is stored at two or more redundant file servers even in the presence of failures associated with one of the file servers.

SUMMARY

The present disclosure describes techniques used in systems, methods, and in computer program products for managing high-availability file servers, which techniques advance the relevant technologies to address technological issues with legacy approaches. More specifically, the present disclosure describes techniques used in systems, methods, and in computer program products for fault tolerant access to file servers in multi-cluster computing environments. Certain embodiments are directed to technological solutions for implementing a high-availability file server capability by automatically directing file I/O requests to one of two or more synchronized file servers in accordance with the then-current status (e.g., health) of the file servers.

The disclosed embodiments modify and improve over legacy approaches. In particular, the herein-disclosed techniques provide technical solutions that address the technical problems attendant to maintaining lossless data availability for at least one file server in the presence of an access interruption that affects at least one of a plurality of synchronized file servers.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
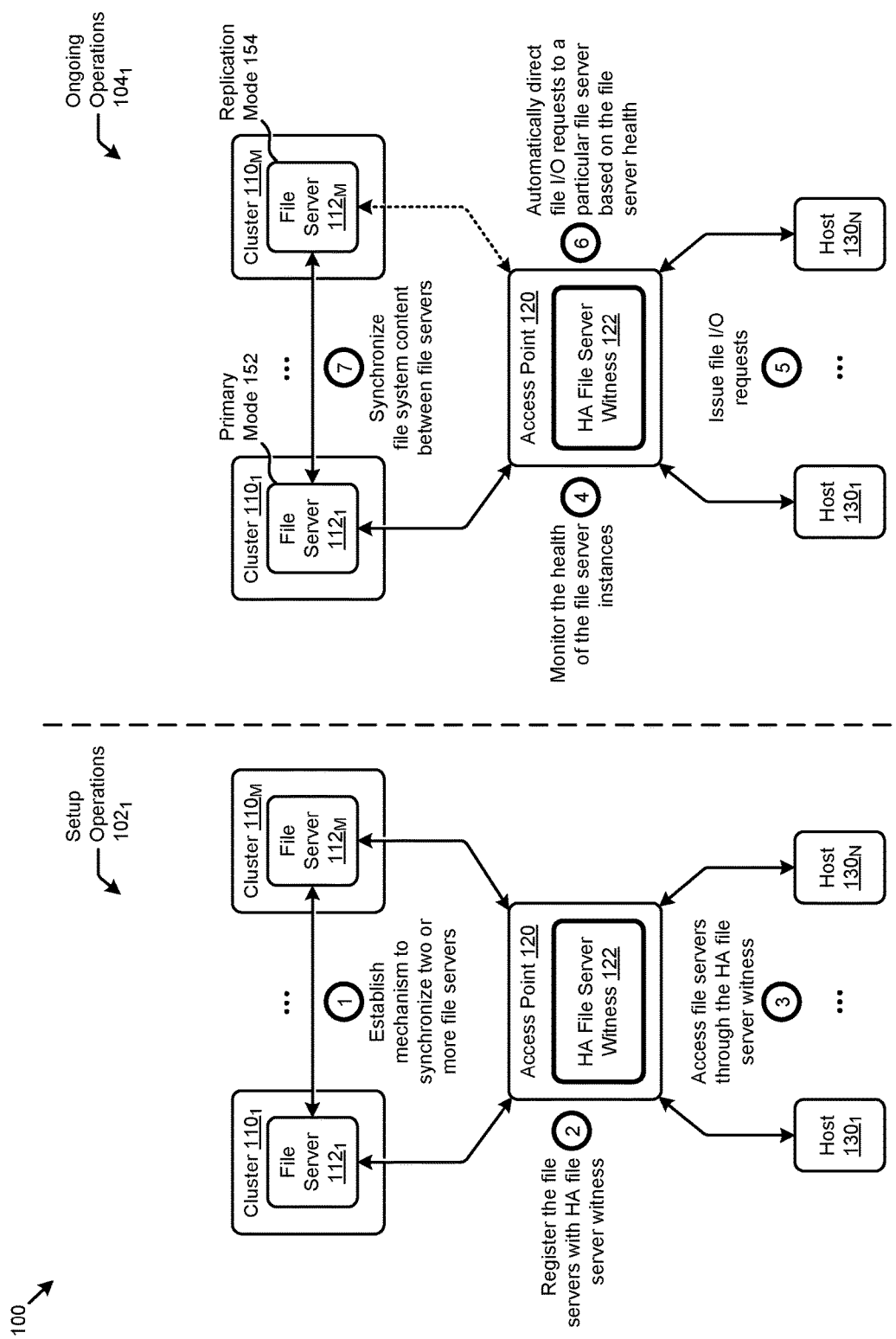
FIG. 1A and FIG. 1B illustrate a computing environment in which embodiments of the present disclosure can be implemented.

Embodiments in accordance with the present disclosure address the problem of maintaining lossless data availability for at least one file server in the presence of an access interruption that affects at least one of a plurality of synchronized file servers. Some embodiments are directed to approaches for implementing a high-availability file server capability by automatically directing file input/output (I/O or IO) requests to one of two or more synchronized file servers in accordance with the then-current status (e.g., health) of the file servers. The accompanying figures and discussions herein present example environments, systems, methods, and computer program products for fault tolerant access to file servers in multi-cluster computing environments.

Overview

Disclosed herein are techniques for implementing a high-availability file server capability by automatically directing file I/O requests to one of two or more synchronized file servers in accordance with the then-current status (e.g., health) of the file servers. In certain embodiments, the file servers are implemented in respective clusters of a computing environment. The file servers are registered with a high-availability file server witness, which can be implemented in a cluster in the computing environment that is separate from the file server clusters. Status indicators (e.g., heartbeats) corresponding to the file servers are continually monitored by the high-availability file server witness. File I/O requests issued from various hosts to access the file system content at the file servers are directed to one of the file servers by the high-availability file server witness. The file server receiving a particular file I/O request is selected based at least in part on the then-current status indicators associated with the file servers. Any updates (e.g., in response to a file I/O write request) to the file system content at one file server is synchronized (e.g., replicated) at the other file servers. If a failure occurs at a file server that was earlier selected to service file I/O requests, the high-availability file server witness selects another file server to service incoming file I/O requests. When the failure is remediated, the file server that failed will be synchronized with any then-up-to-date file server(s).

In certain embodiments, the file servers and the high-availability file server witness are each implemented in separate availability zones and/or in separate failure domains. In certain embodiments, the file servers are implemented using one or more virtual machines. In certain embodiments, synchronous replication techniques and/or witness processes, and/or atomic operations facilitate synchronization of the file servers.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

Figure 1B:
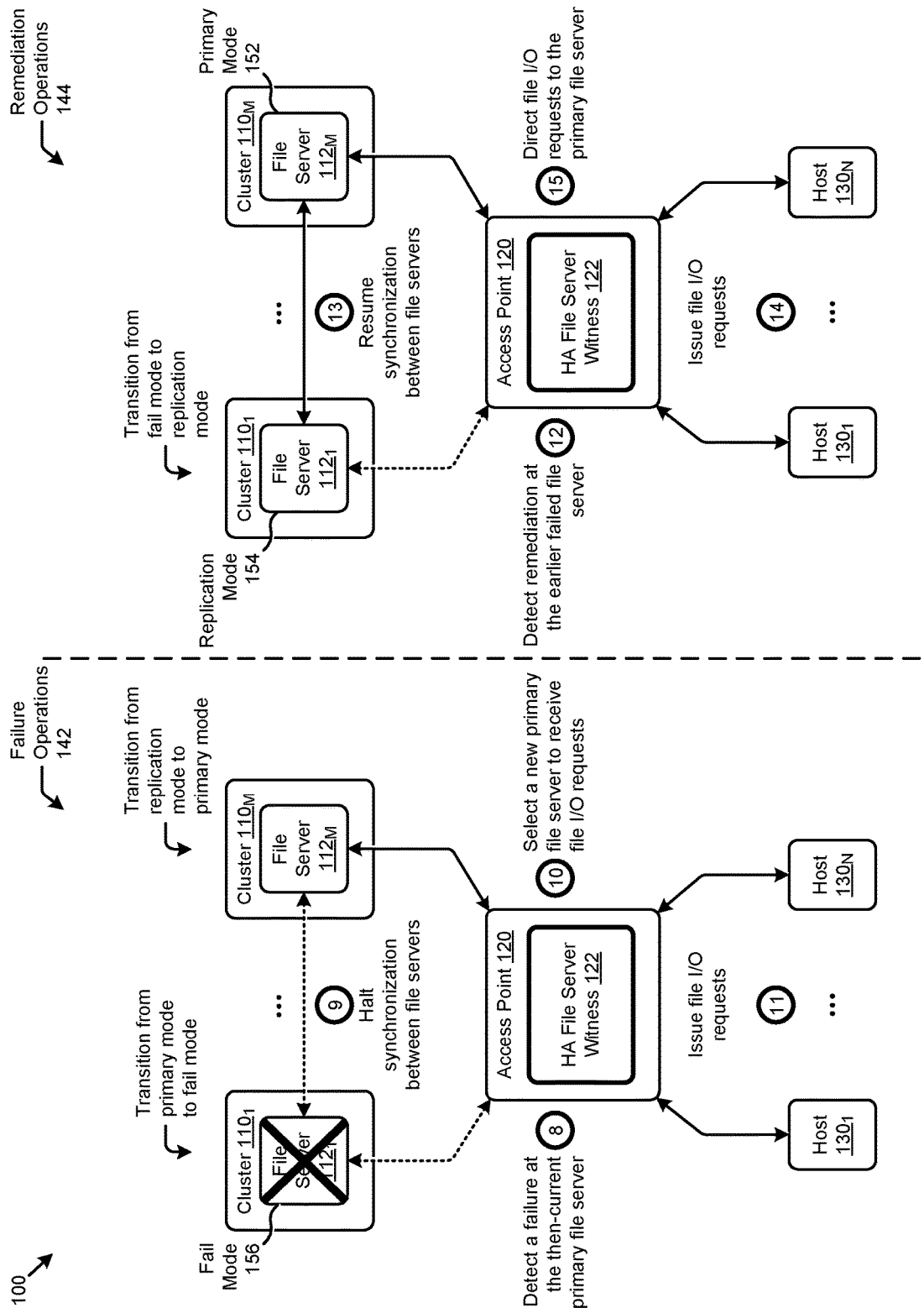

FIG. 1A and FIG. 1B illustrate a computing environment 100 in which embodiments of the present disclosure can be implemented. As an option, one or more variations of computing environment 100 or any aspect thereof may be implemented in the context of the architecture and functionality of the embodiments described herein.

FIG. 1A and FIG. 1B illustrate aspects pertaining to implementing a high-availability file server capability by automatically directing file I/O requests to one of two or more synchronized file servers in accordance with the then-current status (e.g., health) of the file servers. Specifically, the figures present a logical depiction of how the herein disclosed techniques can be implemented and operated in a multi-cluster computing environment to facilitate high-availability access to file system content in the presence of various access interruptions that affect at least a portion of the computing entities (e.g., file servers) that are serving the content. The foregoing high-availability file server capability is illustrated in the figures by four representative sets of operations (e.g., setup operations $102_1$, ongoing operations $104_1$, failure operations 142, and remediation operations 144).

As indicated in the setup operations $102_1$ of FIG. 1A, the herein disclosed techniques can be implemented in computing environment 100 by establishing a mechanism to synchronize two or more instances of file servers (operation 1). As shown, a file server $112_1$ that is implemented in a cluster $110_1$ and a file server $112_M$ that is implemented in a cluster $110_M$ can be configured such that the file system content (e.g., files, folders, documents, content objects, etc.) served by each instance of the file servers are synchronized. As an example, a synchronous replication of the data of each file I/O operation might be configured so as to maintain synchronization between the file servers. More than two synchronized file servers are possible.

To facilitate the herein disclosed techniques, a witness node (e.g., HA file server witness 122) is implemented at an access point 120. As used herein, an access point is a set of computing resources (e.g., at a computing node in a cluster) selected to facilitate various inter-cluster management operations in a multi-cluster computing environment. For example, access point 120 might comprise a user interface that a system administrator can interact with to manage certain aspects (e.g., topology, operation, performance, etc.) of the multi-cluster environment.

Certain specialized processes and/or sets of programming code may also be implemented at access point 120 to carry out the inter-cluster management operations. For example, the capability of the HA file server witness 122 as described herein might be deployed as a set of programming code that is executed by the computing resources of access point 120. In some cases, the HA file server witness 122 and access point 120 are implemented in a cluster that is separate from cluster $110_1$ and cluster $110_M$. The file servers are registered with the HA file server witness 122 (operation 2) to facilitate access to the file servers by one or more hosts (e.g., host $130_1$, . . . , host $130_N$) through the HA file server witness 122 (operation 3). As earlier mentioned, such hosts can be any computing entity in any location that is authorized to send and receive data to and from the file servers. As an example, a host might be an application server which applications are used to manipulate certain objects included in the file system content stored at the file servers. In some cases, the registration of the file servers can, for example, establish certain profile data associated with the file servers that is maintained by the HA file server witness 122 to facilitate forwarding and/or processing of the incoming file I/O requests from the hosts.

As can be observed in the ongoing operations $104_1$ of FIG. 1A, the HA file server witness 122 continually monitors the health of the file servers (e.g., file server $112_1$, . . . , file server $112_M$) (operation 4). For example, HA file server witness 122 might receive certain status indicators associated with file server $112_1$ and file server $112_M$ from cluster $110_1$ and cluster $110_M$ that indicate a healthy (e.g., operating as expected) file server, or an oversubscribed file server, or a file server failure, or a cluster failure, or a connection failure (e.g., between file servers, between clusters, between HA file server witness 122 and a file server, etc.). Other indicators of an unhealthy cluster and/or access path are possible.

Further, during ongoing operations $104_1$ of FIG. 1A, the HA file server witness 122 continually monitors the health of network connections. For example, HA file server witness 122 might monitor a network interface, or a switch, or a router, or a network traffic load balancer, etc., to determine the health of the network connections as well as the status of the network connections based on any observations of then-current network traffic conditions.

As another example of health monitoring, the HA file server witness 122 might merely receive periodic "heartbeats" from the file servers. If the heartbeat corresponding to a particular file server were to cease, that would indicate the presence of some type of failure associated with the file server and/or its network connections.

As such, any file I/O requests issued by the hosts (operation 5) are directed by the HA file server witness 122 to a particular file server based at least in part on the then-current file server health (operation 6). If two or more of the file servers are healthy, the HA file server witness 122 will select one to take on the role of a primary file server and explicitly or implicitly designate the other healthy file servers as replication file servers. As a representative example in FIG. 1A, file server $112_1$ is selected to operate in a primary mode 152 and, by default, becomes the first to receive file I/O requests from HA file server witness 122, while file server $112_M$ operates in a replication mode 154 and receives replication data from file server $112_1$ to maintain synchronization between the file servers (operation 7). In some cases (e.g., with synchronous replication in an active-active configuration, etc.), the file servers achieve synchronization at each file I/O request. One technique to achieve synchronization at each file I/O request is to process I/Os serially, where a later I/O request is not started until the earlier I/O request has been completed at all file servers that are participating in an active-active configuration. As used herein, a file I/O request is a message transmitted over a network to perform one or more operations over the file system content stored at one or more file servers.

The format and/or structure of the file I/O request might depend on the file system implemented at the file servers and/or the mechanism implemented for accessing the file servers. For example, file I/O requests might be configured for Windows-based hosts to access server message block (SMB) file services provided by the file servers. In some embodiments, synchronization is implemented by the file servers at least in that the original recipient of a file I/O request will wait for acknowledgement of the completion of the file I/O request by its active-active peers before processing any further file I/O requests. As such, at the time that an indication of a completion of a particular file I/O request is returned to the requesting host, the file servers that are in active-active cooperation are already synchronized with respect to that particular file I/O.

Referring to the failure operations 142 of FIG. 1B, a failure associated with the then-current primary file server might be detected at HA file server witness 122 (operation 8). In the shown scenario, the failure might correspond to file server $112_1$ at cluster $110_1$, which transitions into a fail mode 156. In response to detecting the failure, HA file server witness 122 will communicate with one or more of the clusters to halt the synchronization between the file servers (operation 9). HA file server witness 122 will then select another file server to service incoming file I/O requests (operation 10). As shown, file server $112_M$ transitions to operate in primary mode 152. As such, and henceforth until remediation of the failed file server, the primary mode file server $112_M$ is the first receive file I/O requests issued by the hosts to the HA file server witness 122 (operation 11).

As depicted in remediation operations 144, when a failure remediation associated with an earlier failed file server is detected by HA file server witness 122 (operation 12), the HA file server witness 122 confirm readiness of the remediated file server to participate in active-active cooperation. When the HA file server witness 122 deems that the remediated file server can resume participation in active-active cooperation, the HA file server witness signals the remediated file server to transition from fail mode to replication mode. When the transition is complete (e.g., an acknowledgement is received by the HA file server witness) then a message is issued by HA file server witness 122 to the active-active file service participants instructing them to resume synchronization between themselves (operation 13).

New file I/O requests issued by the hosts (operation 14) are directed by the HA file server witness 122 to the file server (e.g., file server $112_M$) selected to operate in primary mode 152 (operation 15). As a result of the performance of certain of failure operations 142 in combination with remediation operations 144, a lossless and uninterrupted availability of the file system content at the file servers is maintained even in the presence of an access interruption (e.g., file server failure, network path failure, etc.) that affects the synchronized file servers. As such, a high-availability file server capability in a multi-clustered computing environment is manifested.

The aforementioned high-availability file server capability facilitated by the herein disclosed techniques results in improvements in computer functionality that serve to reduce the demand for computer processing power, reduce the demand for computer memory and data storage, reduce network bandwidth use, and reduce the demand for intercomponent communication in computing environments. Specifically, applications of the herein disclosed techniques reduce the consumption of computing resources by minimizing or eliminating the computing resources consumed by manual file server failover and failback operations as might be performed by an administrator. Still further, applications of the herein disclosed techniques reduce the consumption of computing resources by minimizing or eliminating the computing resources that would be consumed in the course of a manual file server failover and failback intervention at least in that, since the HA file server witness maintains a record of the completion of the last successful I/O operations, the synchronization that would occur in the course of remediation is limited to only those I/Os that had not been synchronized. As such, rollback to an older restore point is avoided, which avoidance saves significant CPU resources as well as networking resources.

One embodiment of techniques for managing such high-availability file server implementations is disclosed in further detail as follows.

Figure 2:
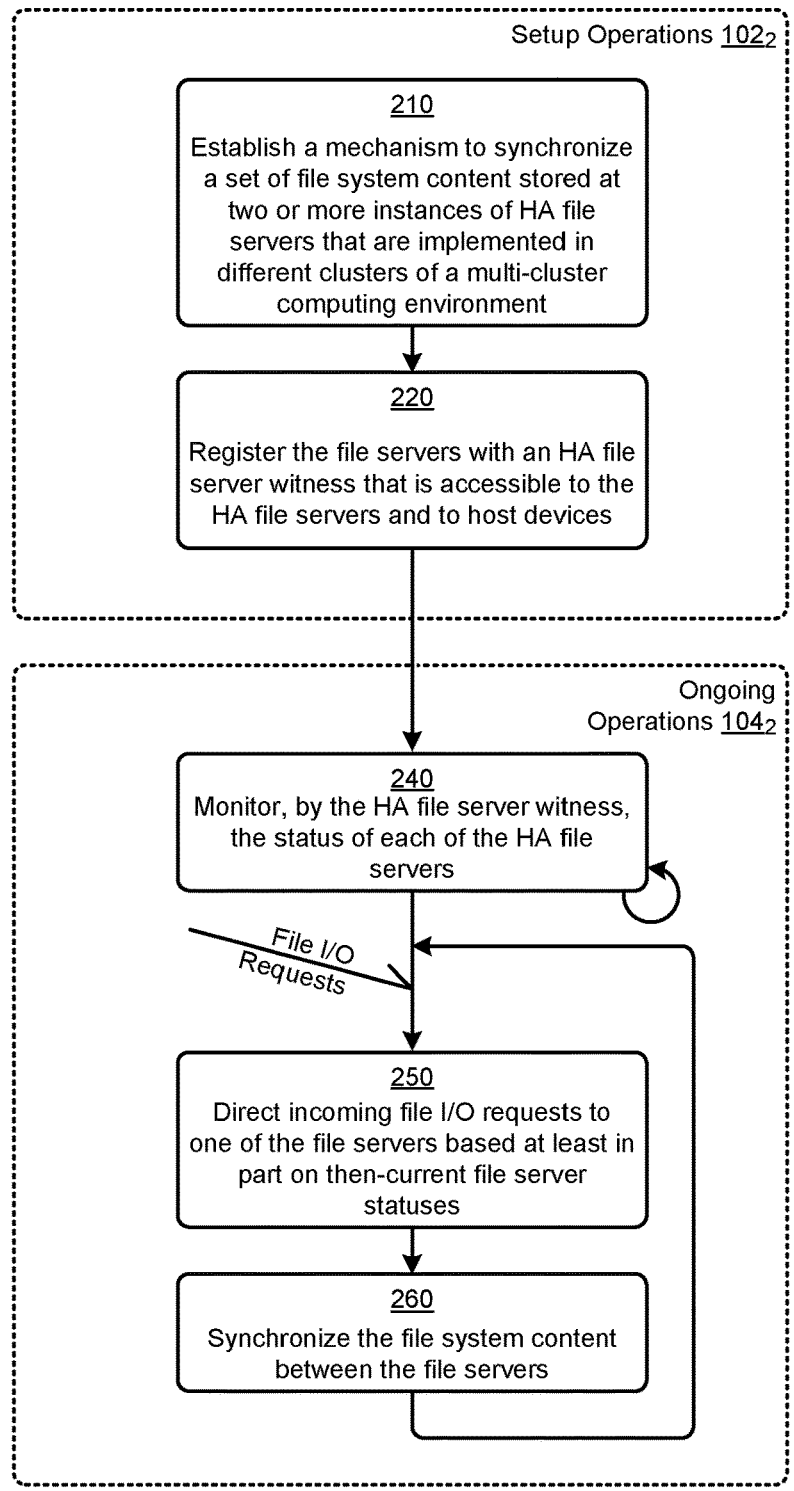
FIG. 2 depicts a high-availability file server management technique as implemented in systems that facilitate fault tolerant access to file servers in multi-cluster computing environments, according to an embodiment.

FIG. 2 depicts a high-availability file server management technique 200 as implemented in systems that facilitate fault tolerant access to file servers in multi-cluster computing environments. As an option, one or more variations of high-availability file server management technique 200 or any aspect thereof may be implemented in the context of the architecture and functionality of the embodiments described herein. The high-availability file server management technique 200 or any aspect thereof may be implemented in any environment.

FIG. 2 illustrates aspects pertaining to implementing a high-availability file server capability by automatically directing file I/O requests to one of two or more synchronized file servers in accordance with the then-current status (e.g., health) of the file servers. Specifically, the figure is presented to illustrate one embodiment of certain high order steps and/or operations that facilitate high-availability access to file system content in the presence of various access interruptions that affect at least a portion of the computing entities (e.g., file servers) that are serving the content. As can be observed, the steps and/or operations can be grouped into a set of setup operations $102_2$ and a set of ongoing operations $104_2$.

The setup operations $102_2$ of the high-availability file server management technique 200 can commence by establishing a mechanism to synchronize the file system content stored at two or more instances of file servers that are implemented in respective clusters of a multi-cluster computing environment (step 210). One example mechanism might deploy synchronous replication techniques whereby a particular modification to the file system content (e.g., a file I/O write request) at a first file server is replicated to other file servers (e.g., a second file server) before the modification is acknowledged as complete and/or committed. Such synchronous replication techniques facilitate lossless content availability if a failover from the first file server to one of the other file servers were to occur. The set of synchronized file servers are registered with a high-availability (HA) file server witness that is implemented in a respective cluster in the multi-cluster computing environment (step 220). In this case, the HA file server witness is in a separate cluster from the clusters hosting their respective file servers. Registering the file servers with an HA file server witness facilitates communications between the HA file server witness and the file servers.

In one specific embodiment, upon registering the file servers with the HA file server witness, specialized connection resources (e.g., high-performance, secure socket connections) are established. A data structure that captures the existence and status of such specialized connection resources is populated at the HA file server witness. The specialized connection resources can be used by any of the hosts that raise I/O requests. More specifically, in certain cases of file I/O, an I/O request might specify a large data extent (e.g., to copy a large file). As such, a high-performance, secure socket connection facilitates accomplishment of the communication of the contents of the large data extent. In many cases, I/O requests raised by a host and received at the HA file server witness are redirected by the HA file server witness back to the requestor together with an indication of a connection resource to be used by the host for carrying out the movement of file data corresponding to the I/O request. During carrying out of the movement of file data corresponding to the I/O request, the HA file server witness continues ongoing operations such as monitoring and tracking of file server profile data.

In particular, the ongoing operations $104_2$ of the high-availability file server management technique 200 including monitoring the status of each of the file servers (step 240). As illustrated in FIG. 2, the monitoring operations are continuous operations that produce, for example, one or more status indicators corresponding to the file servers that can be accessed by the HA file server witness. As earlier mentioned, such status indicators might indicate a healthy (e.g., operating as expected) file server, or might indicate an oversubscribed file server, or a file server failure, or a cluster failure, or a connection failure (e.g., between file servers, between clusters, between the HA file server witness and a file server, etc.). Other indicators of an unhealthy cluster are possible.

The status indicators might also correspond to "heartbeats" from the file servers. In response to file I/O requests from one or more hosts to access the file system content at the file servers, the file I/O requests are directed to one of the file servers based at least in part on the then-current file server status and/or other environmental conditions (step 250). If the then-current file server status indicates two or more of the file servers and their respective network connections are healthy, then the file I/O requests will be directed to a file server selected as the primary file server. If the then-current file server status indicates the primary file server has incurred some failure or is not reachable over the network connections, or is otherwise unhealthy, a new primary file server is selected from the healthy file servers to receive the file I/O requests.

At step 260, the file system content is synchronized between the file servers. If all file servers are healthy, the file system content at each of the file servers is synchronized at each file I/O request according to synchronous replication techniques. Any unhealthy (e.g., failed) file servers will be updated with all file system content changes incurred since failure once the file servers achieve a healthy status.

One embodiment of a system, data flows, and data structures for implementing the high-availability file server management technique 200 and/or other herein disclosed techniques is disclosed as follows.

Figure 3:
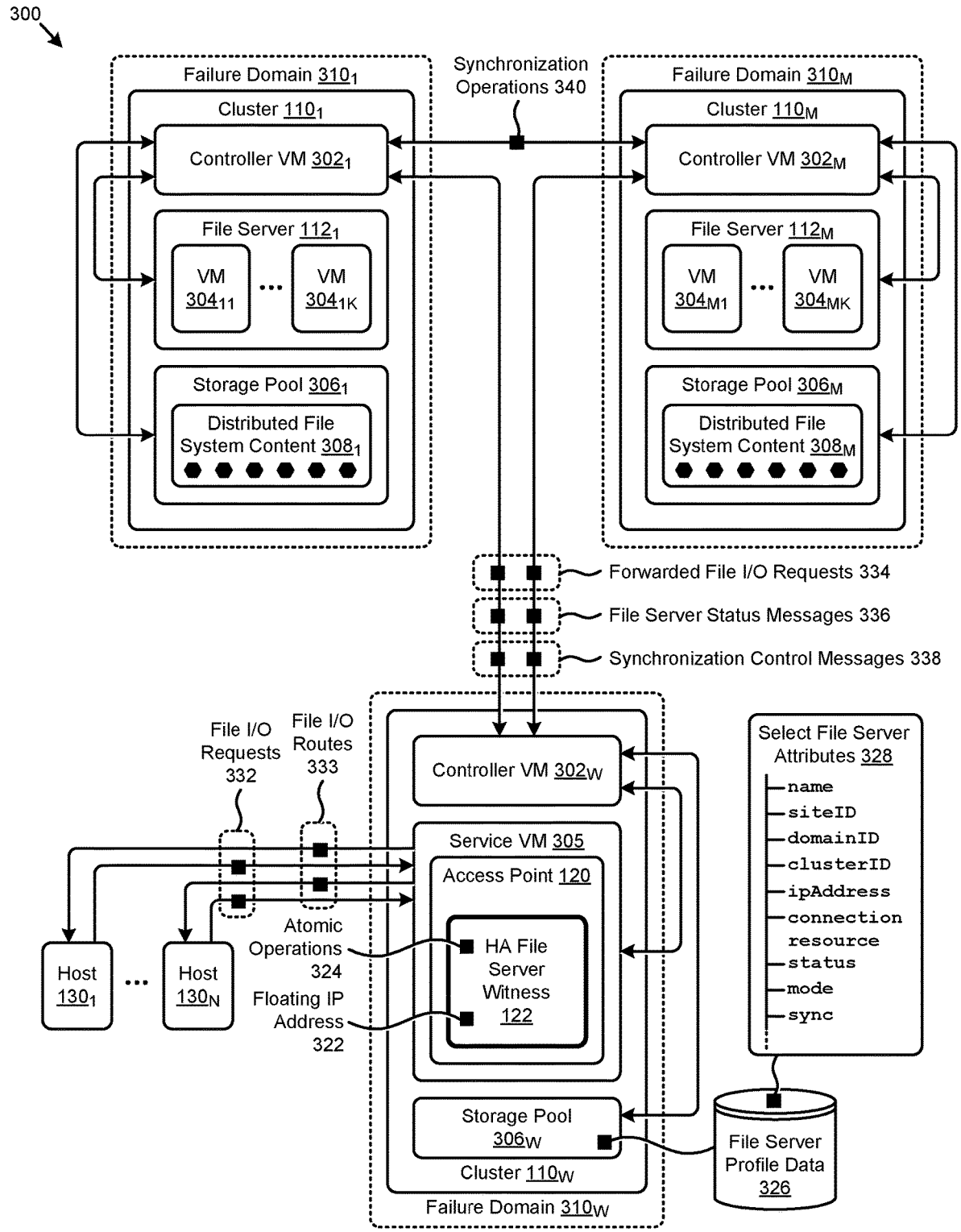
FIG. 3 is a block diagram of a system that implements fault tolerant access to file servers in multi-cluster computing environments, according to an embodiment.

FIG. 3 is a block diagram of a system 300 that implements fault tolerant access to file servers in multi-cluster computing environments. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to implementing a high-availability file server capability by automatically directing file I/O requests to one of two or more synchronized file servers in accordance with the then-current status (e.g., health) of the file servers. Specifically, the figure is being presented to show one embodiment of certain representative components and associated data flows that describes how the herein disclosed techniques might be implemented in a modern multi-cluster computing environment. The components and data flows shown in FIG. 3 present one partitioning and associated data manipulation approach. The specific example shown is purely exemplary, and other subsystems, data structures, and/or partitioning are reasonable.

As shown in FIG. 3, the system 300 comprises at least two file servers (e.g., file server $112_1$ and file server $112_M$) implemented in respective clusters (e.g., cluster $110_1$ and cluster $110_M$). The file servers can be implemented at the clusters using one or more virtual machines (VMs). For example, file server $112_1$ comprises VM $304_{11}$ through VM $304_{1K}$ at cluster $110_1$, and file server $112_M$ comprises VM $304_{M1}$ through VM $304_{MX}$ at cluster $110_M$. A controller VM $302_1$ and a controller VM $302_M$ are implemented at cluster $110_1$ and cluster $110_M$, respectively to facilitate I/O operations between the file server VMs and respective storage pools (e.g., storage pool $306_1$ and storage pool $306_M$) at the clusters. The controller VMs also facilitate inter-cluster communications and/or other operations.

The computing resources underlying the VMs and the storage facilities comprising the storage pools correspond to one or more computing nodes associated (e.g., logically and/or physically) with the clusters. The storage facilities of the storage pools can comprise multiple tiers of storage distributed over the nodes in the clusters. The multiple tiers of storage can include local storage which can be within or directly attached to a server and/or appliance associated with the nodes. Such local storage can include solid state drives (SSDs), hard disk drives (HDDs), and/or other storage devices. In some embodiments, the multiple tiers of storage can include storage that is accessible through an external network, such as a networked storage (e.g., a storage area network or SAN, network attached storage or NAS, etc.).

As can be observed, instances of the file system content associated with each file server (e.g., distributed file system content $308_1$ and distributed file system content $308_M$) can be distributed over the multiple tiers of storage that comprise the respective storage pools (e.g., storage pool $306_1$ and storage pool $306_M$). To facilitate the herein disclosed techniques, controller VM $302_1$ of cluster $110_1$ and controller VM $302_M$ of cluster $110_M$ can interact to perform various instances of synchronization operations 340 that maintain synchronization between the distributed file system content $308_1$ and the distributed file system content $308_M$.

To also facilitate the herein disclosed techniques, an instance of the HA file server witness 122 can operate at an access point 120 which can in turn operate at a service VM 305 implemented in another cluster (e.g., cluster $110_W$) in the multi-cluster computing environment. As can be observed, the service VM 305 might serve as the access point 120 for the multi-cluster computing environment. As used herein, an access point is a set of resources (e.g., virtualized entity, VM, executable container, etc.) in a cluster selected to facilitate various intra-cluster and/or inter-cluster operations. In some cases, an access point 120 can be implemented to serve a particular role (e.g., cluster management, multi-cluster management, multi-region or multi-site management, etc.). The access point 120, for example, might be implemented to facilitate management of the clusters comprising system 300.

A controller VM $302_W$ is also deployed at cluster $110_W$ to manage access to a storage pool $306_W$ at the cluster and to facilitate interactions with the controller VMs of the clusters hosting the file servers and/or any other clusters in system 300. Furthermore, cluster $110_W$ is associated with a failure domain $310_W$, whereas cluster $110_1$ is associated with a failure domain $310_1$ and cluster $110_M$ is associated with a failure domain $310_M$. As used herein, a failure domain or availability domain is logical collection of hardware components (e.g., nodes, switches, racks, etc.) that are affected by failures within the collection. As an example, a failure domain might comprise a single physical node appliance or a rack of node appliances that comprise a cluster. As additional examples, a failure domain might comprise a set of computing components that are powered by the same alternating current (AC) to direct current (DC) power supply. The separate failure domains of cluster $110_1$, cluster $110_M$, and cluster $110_W$ are drawn to indicate that a failure in a particular cluster will not affect any other clusters.

According to the herein disclosed techniques, the HA file server witness 122 might receive certain registration information from file server $112_1$ and file server $112_M$ (e.g., through the respective controller VMs at the clusters). The registration information can be used to establish various collections of file server profile data 326 corresponding to the registered file servers. The file server profile data 326 and/or any other data described herein can be organized and/or stored using various techniques. For example, a set of select file server attributes 328 indicate that the file server profile data 326 might be organized and/or stored in a tabular structure (e.g., relational database table) that has rows that relate various user attributes with a particular file server.

As another example, the information might be organized and/or stored in a programming code object (not shown, for simplicity) that has instances corresponding to a particular file server and properties corresponding to the various attributes associated with the file server. As depicted in select file server attributes 328, a data record (e.g., table row or object instance) for a particular file server might describe a file server name (e.g., stored in a "name" field), a site identifier (e.g., stored in a "siteID" field), a failure domain identifier (e.g., stored in a "domainID" field), a cluster identifier (e.g., stored in a "cluster ID" field), a file server URL or IP address (e.g., stored in an "ipAddress" field), a connection resource (e.g., stored in a "connectionResource" field), a file server status indicator (e.g., stored in a "status" field), a file server operational mode (e.g., stored in a "mode" field), a file server synchronization status (e.g., stored in a "sync" field), and/or other file server attributes.

Certain portions of the file server attributes stored in file server profile data 326 are static, while other portions of the attributes change over time. As an example, file server monitoring operations might generate instances of file server status messages 336 that are received by HA file server witness 122 through controller VM $302_W$. Such messages might comprise certain status indicators associated with the file servers that are codified (e.g., in the "status" fields) of respective instances of file server profile data 326.

The then-current status information can be accessed to facilitate certain techniques disclosed herein. Specifically, when instances of file I/O requests 332 are received from various hosts (e.g., host $130_1$, . . . , host $130_N$) at the HA file server witness 122, the then-current status information at the file server profile data 326 is accessed to facilitate directing the file I/O requests 332 to one of the file servers. Instances of forwarded file I/O requests 334 that correspond to the file I/O requests 332 are issued to a selected one of the file servers through the controller VMs at the clusters. For example, a file I/O request from host $130_1$ that merely updates a file system directory or metadata entry might be forwarded by HA file server witness 122 to file server $112_1$ without being redirected. However, when a file I/O request from host $130_1$ calls for large amount of data to be read from or written to distributed file system content $308_1$, the I/O request or portion thereof might be redirected by HA file server witness 122 to the requestor. In some embodiments, the HA file server witness is configured to make a determination as to whether to complete the requested I/O with the target file server (e.g., in the case of a small I/O request), or whether to redirect the I/O back to the requestor to have the requestor complete the requested I/O with the target file server (e.g., in the case of a large I/O request). In some embodiments, the HA file server witness is configured to identify one or more file I/O routes 333 and one or more corresponding connection resources prior to redirecting the I/O back to the requestor.

As previously indicated, the active-active file servers implement synchronous replication of the data for each file I/O operation. For example, before a write is committed at distributed file system content $308_1$ and completion of the file I/O write is acknowledged to the requesting host $130_1$, one or more synchronization operations 340 are issued to file server $112_M$ to perform a replica of the write operation at distributed file system content $308_M$. The synchronization statuses of the file servers participating in the foregoing synchronization process are communicated to the HA file server witness 122 (e.g., for recording in the file server profile data 326) using one or more atomic operations 324. The atomic operations 324 (e.g., using semaphores and/or compare and swap techniques) ensure that synchronization is achieved even in the presence of various failures associated with the file servers. For example, the atomic operation guarantees that only the first one of multiple compare-and-swap operations result in an ownership or leadership determination, whereas the Nth, not first ones of multiple compare-and-swap operations result in agreement that there has already been one owner or leader established. In some cases, the atomic operations serve to establish a quorum from among a set of active-active HA file servers. In some cases, the atomic operations serve to establish a primary mode file server from among a set of active-active HA file servers.

Further details regarding atomic operations and use of quorums are described in U.S. application Ser. No. 16/041,348 titled "TWO NODE CLUSTERS RECOVERY ON FAILURE", filed on Jul. 20, 2018, which is hereby incorporated by reference in its entirety.

When a failure is detected at one or more of the file servers and/or at one or more of the communication links between the file servers and the HA file server witness 122, various remediation actions are taken. As one example, one or more synchronization control messages 338 might be issued from HA file server witness 122 to one or more of the file servers. Such synchronization control messages might be issued to halt or resume synchronization between the file servers. The HA file server witness 122 might also deploy a floating IP address 322 that is mapped to a physical (e.g., dotted quads) or virtual IP address of the one file server (e.g., the primary file server) that is selected to first receive instances of the forwarded file I/O requests 334. In some cases, the HA file server witness 122 might further modify the operating modes (e.g., primary mode, replication mode, etc.) of one or more of the file servers in response to changing conditions. For example, in the event that a first network path to a first file server becomes congested or is otherwise deemed to be slower than a second network path to a second file server, then the HA file server witness might instruct the second file server to take-on the role of primary file server.

In some implementations, the HA file server witness might include mode instructions and/or mode indications (e.g., primary mode, replication mode, etc.) together with each forwarded file I/O request. In some implementations, a synchronization control message might include an indication that the receiving file server is to operate in primary mode for the corresponding file I/O. In some cases, operation in primary mode by a receiving file server is inherent based on the network connection over which a file I/O request is received.

The foregoing discussions include techniques for monitoring the status (e.g., health) of a set of synchronized file servers (e.g., step 240 of FIG. 2), which techniques are disclosed in further detail as follows.

Figure 4:
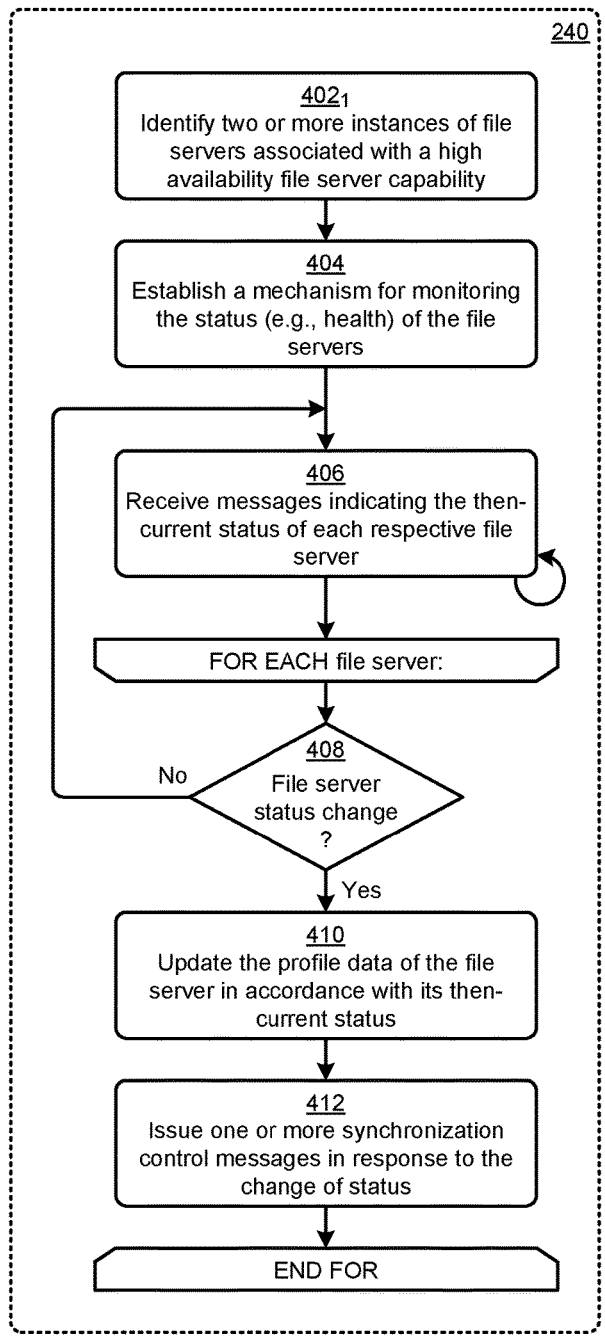
FIG. 4 presents a file server monitoring technique as implemented in systems that facilitate fault tolerant access to file servers in multi-cluster computing environments, according to an embodiment.
Figure 4:
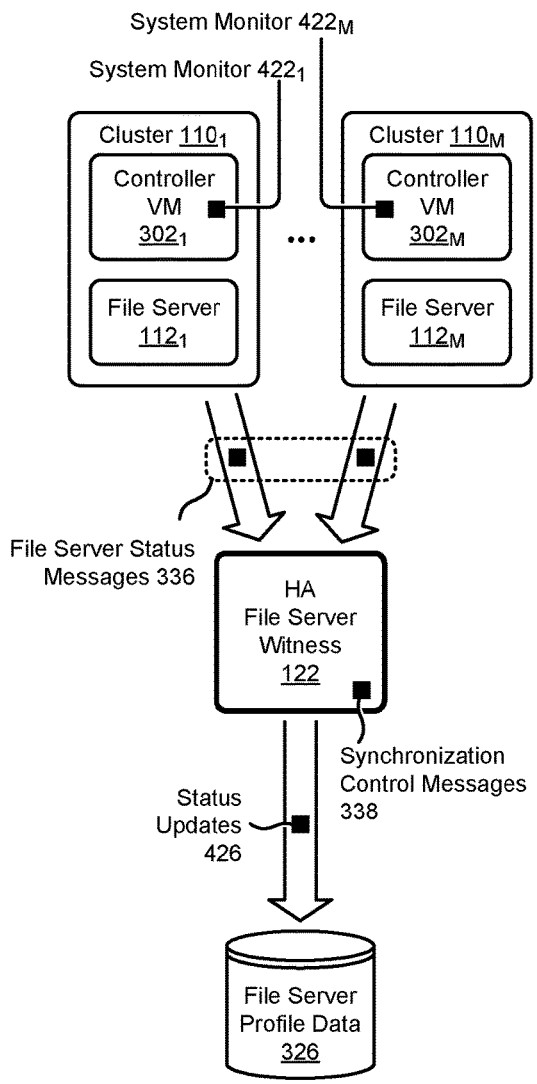

FIG. 4 presents a file server monitoring technique 400 as implemented in systems that facilitate fault tolerant access to file servers in multi-cluster computing environments. As an option, one or more variations of file server monitoring technique 400 or any aspect thereof may be implemented in the context of the architecture and functionality of the embodiments described herein. The file server monitoring technique 400 or any aspect thereof may be implemented in any environment.

FIG. 4 illustrates aspects pertaining to implementing a high-availability file server capability by automatically directing file I/O requests to one of two or more synchronized file servers in accordance with the then-current status (e.g., health) of the file servers. Specifically, the figure is presented to illustrate one embodiment of certain steps and/or operations that facilitate monitoring the status (e.g., health) of two or more synchronized file servers in a multi-cluster computing environment. A representative scenario is also shown in the figure to illustrate an example application of the file server monitoring technique 400.

The file server monitoring technique 400 can commence by identifying two or more instances of file servers that are associated with a high-availability file server capability (step $402_1$). As illustrated, a file server $112_1$ at cluster $110_1$ and a file server $112_M$ at cluster $110_M$ might be synchronized and managed in accordance with the herein disclosed techniques to deliver the high-availability file server capability. A mechanism for monitoring the status (e.g., operational status, health, etc.) of the file servers is established (step 404). For example, sets of programming code to execute system monitoring operations over the file servers might be implemented in the clusters comprising the file servers. As shown in FIG. 4, system monitors (e.g., system monitor $422_1$ and system monitor $422_M$) might be deployed in the controller VMs (e.g., controller VM $302_1$ and controller VM $302_M$) of the clusters associated with the file servers. Messages that indicate the then-current status of each respective file server are received (step 406). Such messages (e.g., file server status messages 336) might be issued from the system monitors and received by an instance of the HA file server witness 122. As indicated in FIG. 4, the messages are continually received (e.g., in accordance with various schedules or events).

For each of the file servers, if one or more file server status messages associated with the file server indicate there is no change to the status of the file server (see "No" path of decision 408), then the process continues to listen for additional file server status messages (step 406). If a change to the file server status is detected (see "Yes" path of decision 408), then the profile data associated with the file server is updated in accordance with the then-current status of the file server (step 410). For example, HA file server witness 122 might execute one or more status updates 426 to the file server profile data 326 in response to detecting one or more file server status changes as indicated in one or more file server status messages. In some cases, one or more synchronization control messages might be issued in response to a status change (step 412). As an example, one or more synchronization control message 338 might be issued by HA file server witness 122 to halt synchronization if the status of one of the file servers changed from healthy to failed.

The foregoing discussions include techniques for servicing (e.g., directing, forwarding, routing, processing, etc.) file I/O requests issued to operate over the file system content associated with a high-availability file server capability (e.g., step 250 of FIG. 2), which techniques are disclosed in further detail as follows.

Figure 5A:
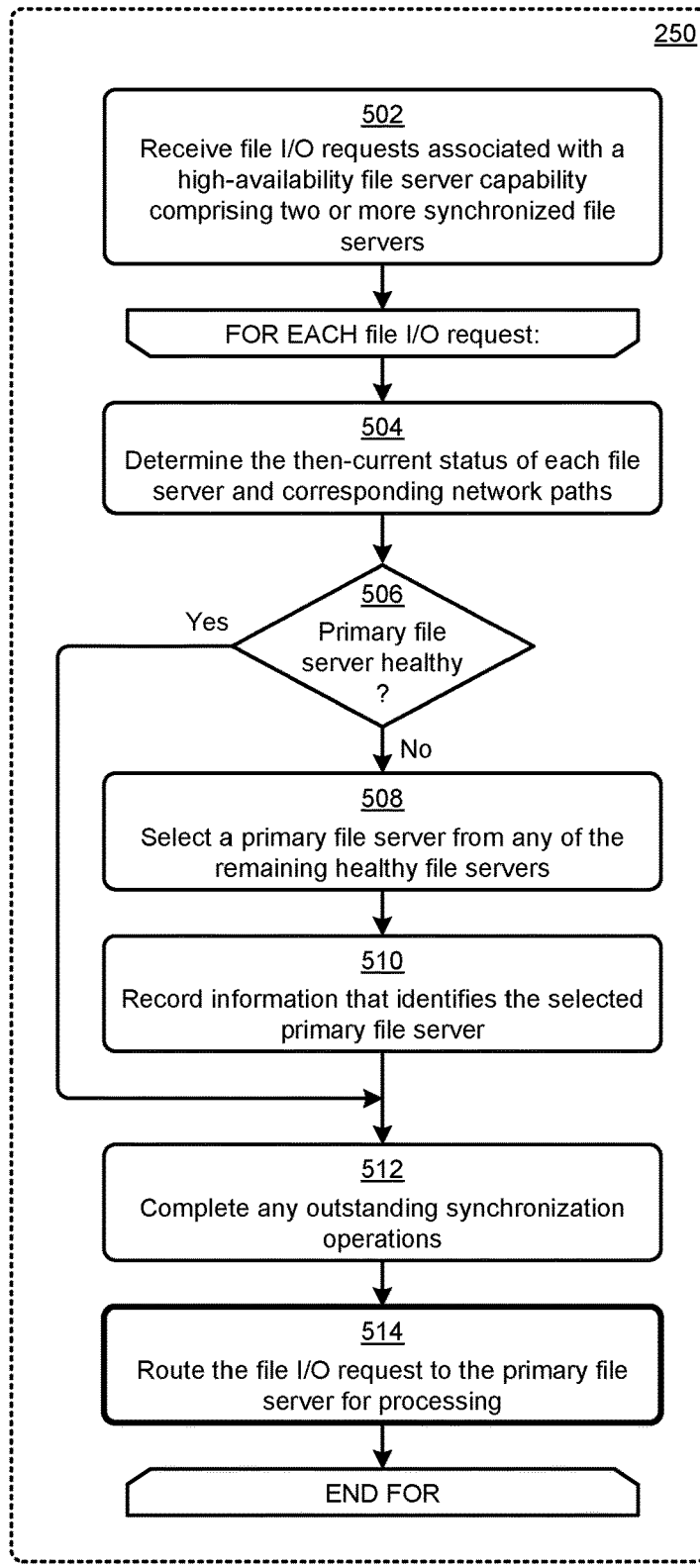
FIG. 5A depicts a file I/O request servicing technique as implemented in systems that facilitate fault tolerant access to file servers in multi-cluster computing environments, according to an embodiment.

FIG. 5A depicts a file I/O request servicing technique 5A00 as implemented in systems that facilitate fault tolerant access to file servers in multi-cluster computing environments. As an option, one or more variations of file I/O request servicing technique 5A00 or any aspect thereof may be implemented in the context of the architecture and functionality of the embodiments described herein. The file I/O request servicing technique 5A00 or any aspect thereof may be implemented in any environment.

FIG. 5A illustrates aspects pertaining to implementing a high-availability file server capability by automatically directing file I/O requests to one of two or more synchronized file servers in accordance with the then-current status (e.g., health) of the file servers. Specifically, the figure is presented to illustrate one embodiment of certain steps and/or operations that facilitate the automatic directing or other servicing of the file I/O requests issued to operate over the file system content associated with the file servers based at least in part on the then-current status of the file servers.

The file I/O request servicing technique 5A00 can commence by receiving one or more file I/O requests associated with a high-availability file server capability that is facilitated at least in part by two more synchronized file servers (step 502). To process each of the file I/O requests received, the then-current status of the file servers comprising the high-availability file server capability is determined (step 504). For example, the file server profile data described earlier might be accessed to determine the then-current file server status. Additionally, or alternatively, step 504 might include determinations of the health and/or traffic conditions, and/or over- or under-subscription of network paths used by the file servers.

If the then-current primary file server is not healthy according to the then-current status (see "No" path of decision 506), then a primary file server is selected from the remaining healthy file servers from the synchronized file servers (step 508). In situations where the high-availability file server capability is implemented by a pair of synchronized file servers, merely one remaining healthy file server might be available for selection as the primary file server. In other cases, various selection techniques (e.g., random, round robin, etc.) might be applied to select a primary file server from a plurality of healthy file servers. Certain information that identifies the selected file server as the primary file server is recorded (step 510). As an example, a "mode" field in the earlier mentioned file server profile data might associate a "primary mode" with a particular file server selected to serve as the primary file server.

Having newly selected a healthy primary file server or determined that an earlier selected primary file server is healthy (see "Yes" path of decision 506), any outstanding synchronization operations are then completed at all healthy file servers (step 512). For example, in synchronous replication implementations, any synchronous operations corresponding to an earlier received file I/O request are completed at all participating file servers (e.g., healthy file servers) before a further file I/O request is processed. In some cases, all synchronization operations might be earlier or concurrently halted by another process (e.g., the file server monitoring technique 400 of FIG. 4) in response to, for example, a file server status change (e.g., from healthy to failed).

When all synchronization operations are completed (or halted), the file I/O request is routed to the primary file server for processing (step 514). In some cases, such file I/O request routing (e.g., directing, forwarding, etc.) might be facilitated by mapping a floating IP address to a file server IP address.

In some embodiments, the file I/O request routing employs a technique for managing a set of connection resources that facilitate high-performance and secure communications between network-interconnected failure domains. More specifically, step 514 can be implemented in whole or in part by a connection resource management technique such as is shown and described as pertains to FIG. 5B.

Figure 5B:
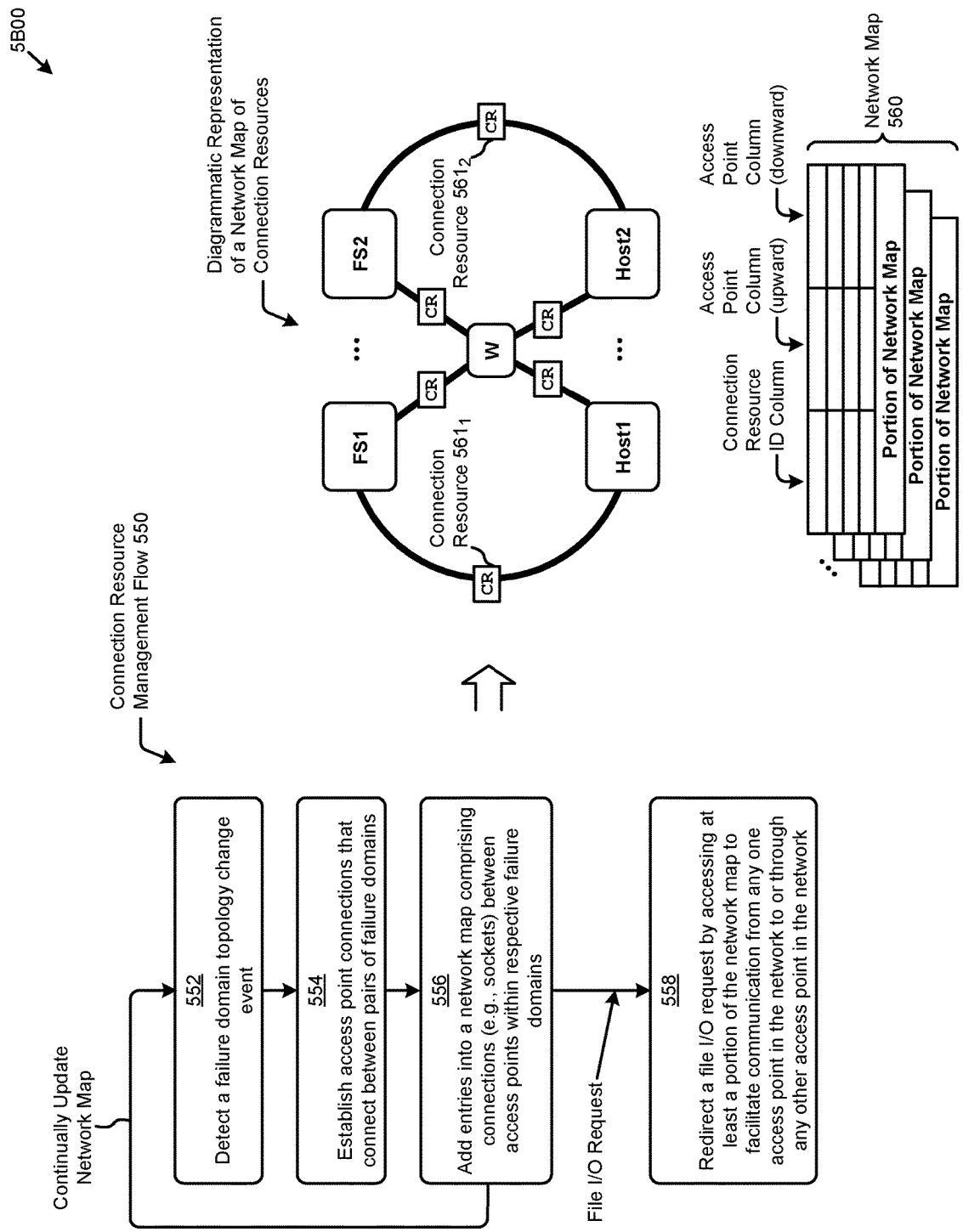
FIG. 5B is a diagram that illustrates a connection resource management technique, according to an embodiment.

FIG. 5B is a diagram that illustrates a connection resource management technique 5B00. The diagram shows maintaining and using connection resources between network-interconnected failure domains. Such connection resources may be used to implement a high-availability file server capability.

The technique operates by mapping file I/O requests to connection resources that in turn are used to facilitate network I/O between one of two or more synchronized file servers. More specifically, and as depicted by shown connection resource management flow 550, the flow continuously monitors changes to the network topology and responds to changes by establishing and maintaining a network map of connection resources. As illustrated, the connection resource network mapping flow commences by detecting a failure domain topology change event (step 552). For example, a failure domain topology change event might be triggered by a registry change (e.g., a new host added into a failure domain) or a topology change (e.g., the boundary of a failure domain is redrawn). Responsive to the event, various access points in the environment are identified, and certain pairs of access points in the various failure domains are selected (step 554). Connections (e.g., connection resource $561_1$, connection resource $561_2$, etc.) are established between access points of the selected pairs. Once the connections are verified to be operational and have been authenticated, step 556 serves to populate a network map by adding entries to data structures comprising characteristics (e.g., secure socket descriptions) of the authenticated connections.

A schematic diagram of a network map of connection resources is shown. As can be observed, the network map can be continually updated by listening for and detecting failure domain topology change events.

At any moment in time, portions of the then-current network map are used to facilitate communication from any one access point in the network to or through any other access point in the network (step 558). For example, using the network map 560 or a portion thereof, host "Host1" can communicate with file server "FS1" directly using connection resource $561_1$. Similarly, using the network map 560 or a portion thereof, host "Host2" can communicate with file server "FS2" directly using connection resource $561_2$. Alternatively, or additionally, host "Host1" can communicate with file server "FS1" and/or file server "FS2" by routing through witness "W". In some cases, two or more file servers (e.g., file server "FS1", file server "FS2", etc.) can carry out ongoing synchronization between themselves using a connection resource.

The foregoing discussions include techniques for synchronizing the file system content of two or more file servers associated with a high-availability file server capability (e.g., step 260 of FIG. 2), which techniques are disclosed in further detail as follows.

Figure 6:
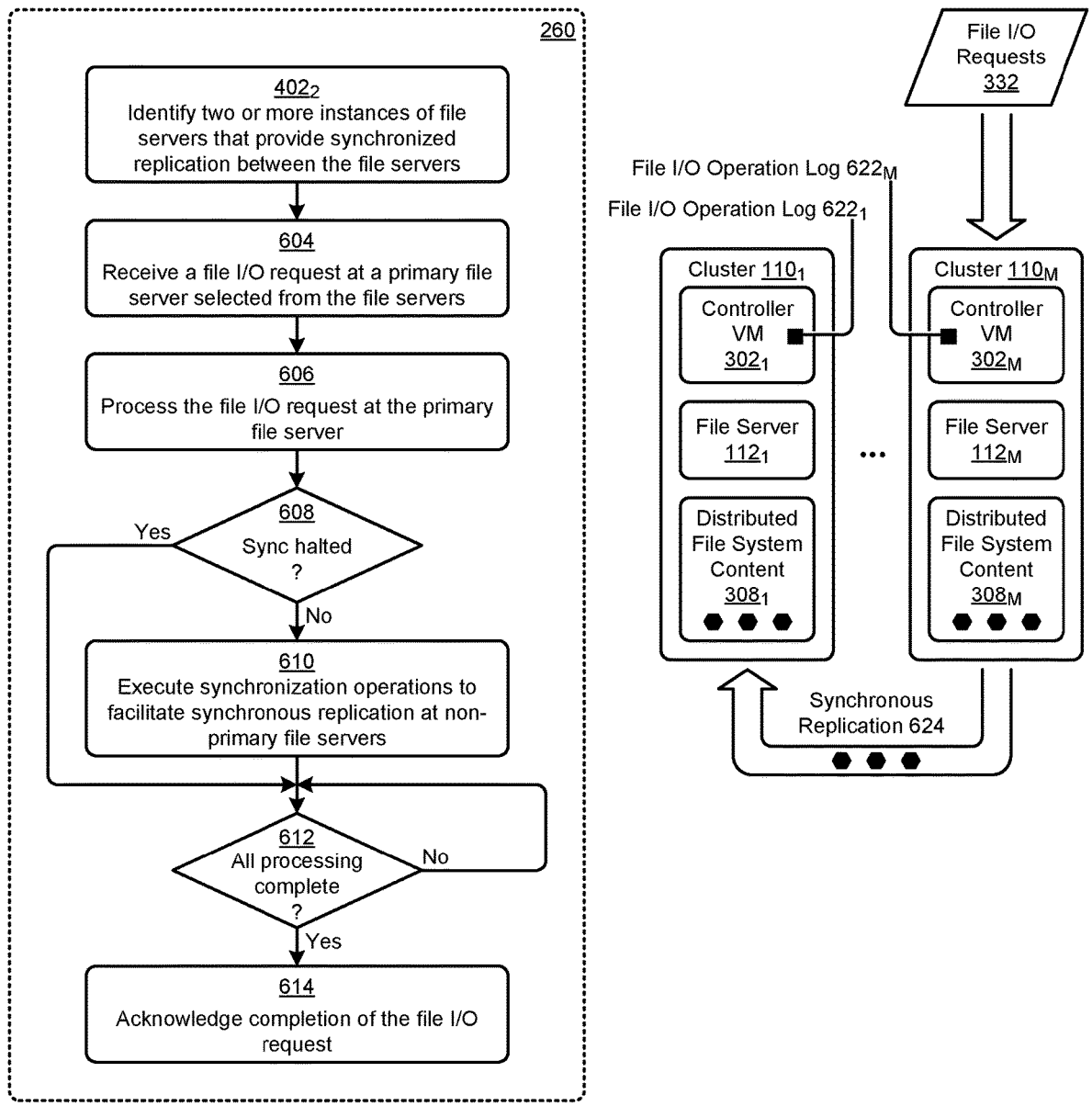
FIG. 6 depicts a file server synchronization technique as implemented in systems that facilitate fault tolerant access to file servers in multi-cluster computing environments, according to an embodiment.

FIG. 6 depicts a file server synchronization technique 600 as implemented in systems that facilitate fault tolerant access to file servers in multi-cluster computing environments. As an option, one or more variations of file server synchronization technique 600 or any aspect thereof may be implemented in the context of the architecture and functionality of the embodiments described herein. The file server synchronization technique 600 or any aspect thereof may be implemented in any environment.

FIG. 6 illustrates aspects pertaining to implementing a high-availability file server capability by automatically directing file I/O requests to one of two or more synchronized file servers in accordance with the then-current status (e.g., health) of the file servers. Specifically, the figure is presented to illustrate one embodiment of certain steps and/or operations that facilitate synchronization of instances of a set of file system content stored at two or more file servers according to a synchronous replication approach. A representative scenario is also shown in the figure to illustrate an example application of the file server synchronization technique 600.

The file server synchronization technique 600 can commence by identifying two or more instances of file servers that are associated with a high-availability file server capability (step $402_2$). As illustrated, a file server $112_1$ at cluster $110_1$ and a file server $112_M$ at cluster $110_M$ might be implemented to deliver the high-availability file server capability in accordance with the herein disclosed techniques. As such, a respective instance of a set of file system content (e.g., distributed file system content $308_1$ and distributed file system content $308_M$) is managed by each file server. When a file I/O request is received at a primary file server selected from the file servers (step 604), the file I/O request is processed at the primary file server (step 606). As an example, a particular file I/O request from the file I/O requests 332 might be received at file server $112_M$ (e.g., the primary file server).

There are many reasons why synchronization between the file servers might be halted. For example, it can happen that communications between the file servers are interrupted or, it can happen that the file server witness to which the filer servers are registered has determined that a failover should be commenced, for example due to a health status. A halt indication can be raised by any component of the system. In exemplary embodiments, a halt indication is raised by a file server witness in response to a determination that one of the file servers and/or its communication links are no longer sufficiently healthy to continue serving as a synchronized file server.

If synchronization is halted (see "Yes" path of decision 608), the ongoing synchronization efforts are abandoned, and processing control passes to steps that complete currently in-process I/Os. However. if synchronization is not halted (see "No" path of decision 608), then one or more synchronization operations are executed to facilitate synchronous replication at any file servers that are not the then-current primary file servers (e.g., non-primary file servers). As earlier described, such synchronization operations might be facilitated by the controller VMs (e.g., controller VM $302_1$ and controller VM $302_M$) at the clusters hosting the file servers. More specifically, in the case of a file I/O write request, when data associated with the request is written to file I/O operations log $622_M$ associated with the primary file server, the same data is synchronously replicated to the file I/O operations log $622_1$ of any other file servers comprising the set of two or more file servers.

More particularly, each of the aforementioned file I/O operations logs comprise all file I/Os that have been received at a respective controller VM. As such, the contents of one log (e.g., file I/O operations log $622_1$) can be compared with another log (e.g., file I/O operations log $622_1$) to determine which I/Os need to be applied to which file servers in order to become synchronized. A process to synchronize all file servers in an HA group can be invoked at any time, and more particularly, at a moment in time after remediation. In the example of FIG. 6, synchronization after remediation occurs during performance of step 610.

When all file I/O processing at all file servers is complete (see "Yes" path of decision 612), a successful completion of the file I/O request is acknowledged (step 614) and a synchronous replication 624 between the file servers (e.g., file server $112_1$ and file server $112_M$) is achieved. If the file I/O processing is not complete (see "No" path of decision 612), the file server synchronization technique 600 will continue to wait for completion of the file I/O request before acknowledging that the file I/O request has been successfully completed.

Additional Embodiments of the Disclosure

Additional Practical Application Examples

Figure 7A:
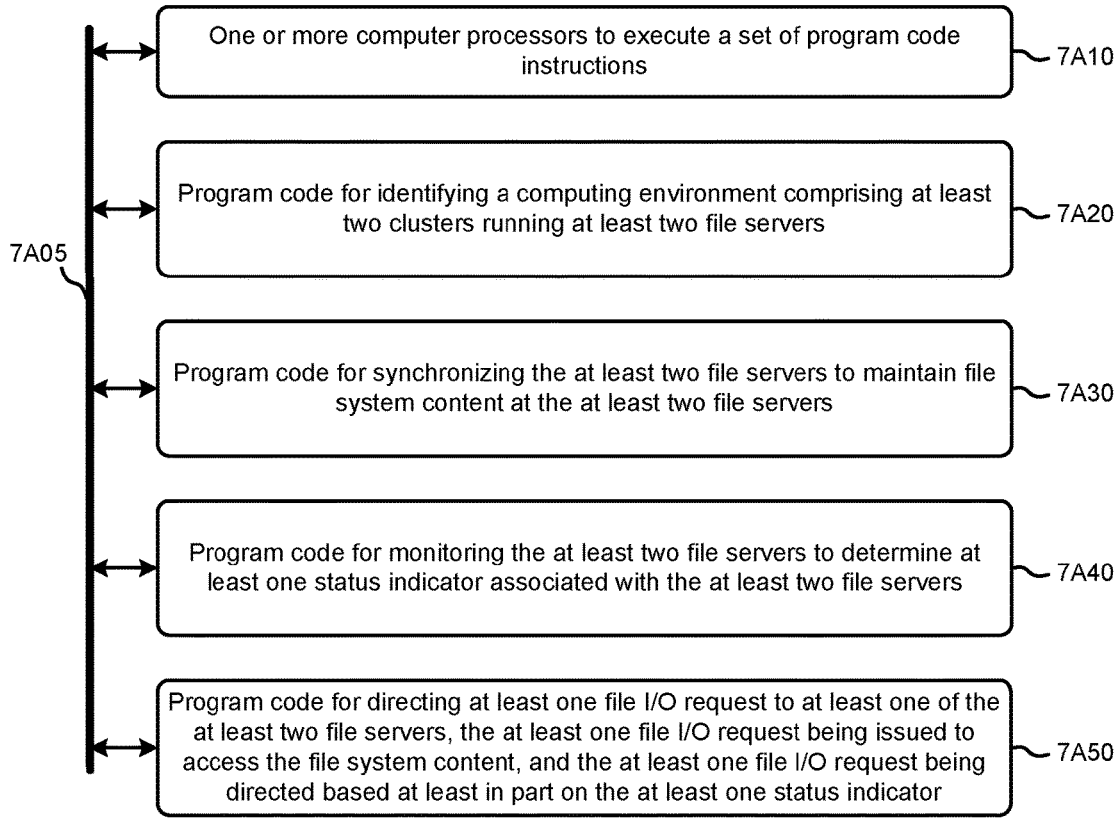
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement high-availability file servers. This and other embodiments present particular arrangements of elements that, individually or as combined, serve to form improved technological processes that address maintaining lossless data availability for at least one file server in the presence of an access interruption that affects at least one of a plurality of synchronized file servers. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: identifying a computing environment comprising at least two clusters running at least two file servers (module 7A20); synchronizing the at least two file servers to maintain file system content at the at least two file servers (module 7A30); monitoring the at least two file servers to determine at least one status indicator associated with the at least two file servers (module 7A40); and directing at least one file I/O request to at least one of the at least two file servers, the at least one file I/O request being issued to access the file system content, and the at least one file I/O request being directed based at least in part on the at least one status indicator (module 7A50).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

Figure 7B:
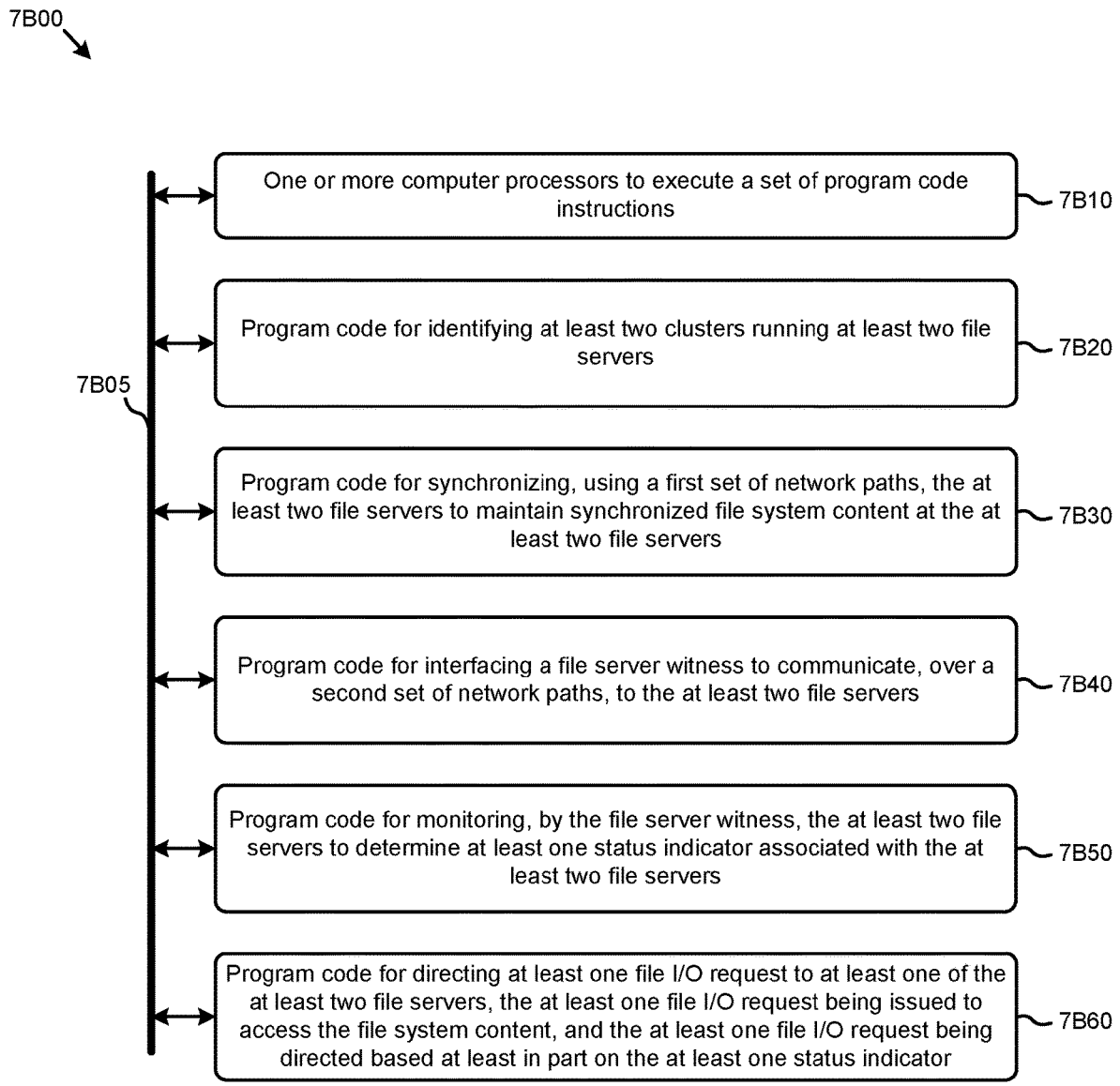

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims.

The shown embodiment implements a portion of a computing environment, presented as system 7B00, comprising one or more computer processors to execute a set of program code instructions (module 7B10) and modules for accessing memory to hold program code instructions to perform: identifying at least two clusters running at least two file servers (module 7B20); synchronizing, using a first set of network paths, the at least two file servers to maintain synchronized file system content at the at least two file servers (module 7B30); interfacing a file server witness to communicate, over a second set of network paths, to the at least two file servers (module 7B40); monitoring, by the file server witness, the at least two file servers to determine at least one status indicator associated with the at least two file servers (module 7B50); and directing at least one file I/O request to at least one of the at least two file servers, the at least one file I/O request being issued to access the file system content, and the at least one file I/O request being directed based at least in part on the at least one status indicator (module 7B60).

System Architecture Overview

Additional System Architecture Examples

Figure 8A:
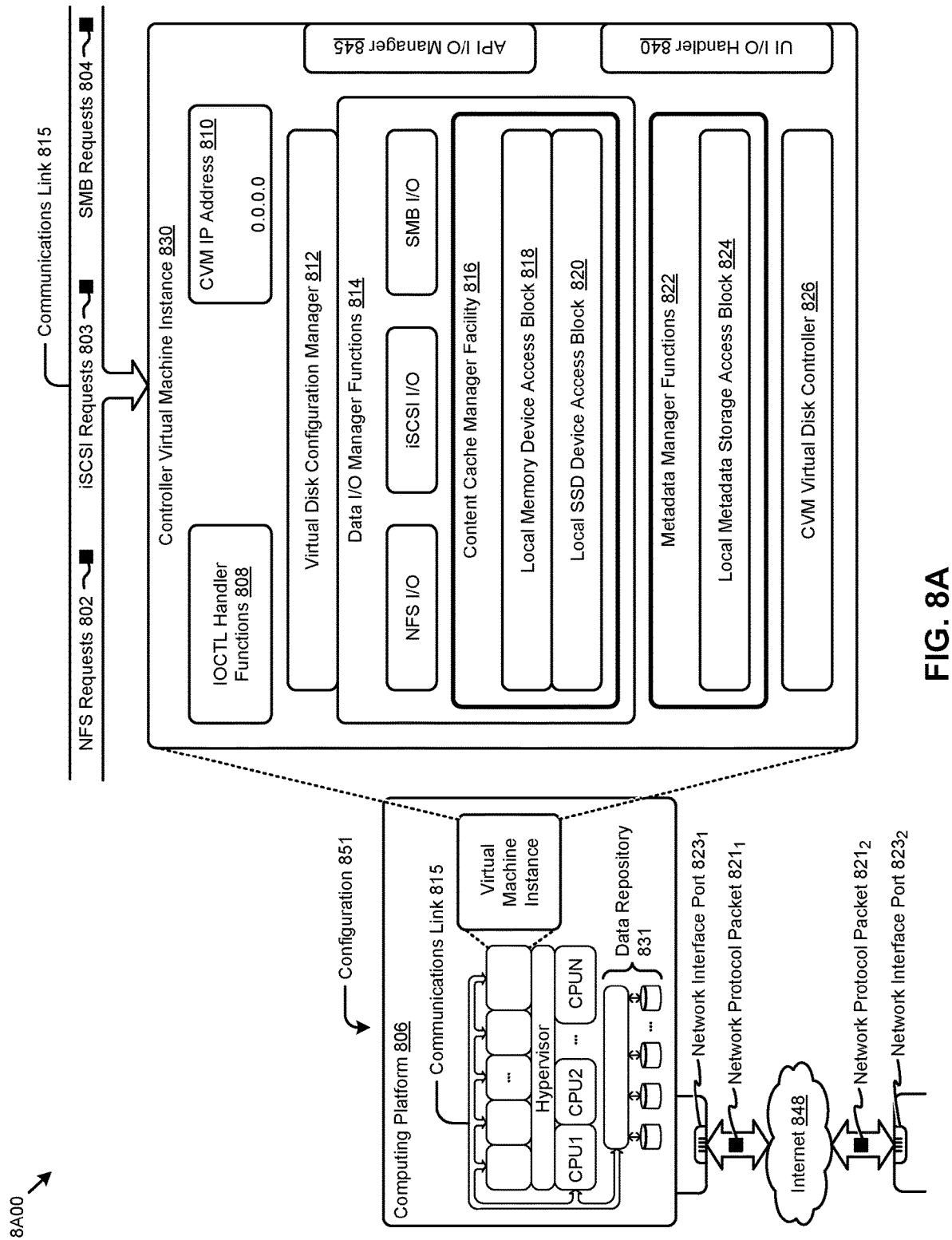
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block TO functions (e.g., NFS TO, iSCSI TO, SMB TO, etc.).

In addition to block TO functions, configuration 851 supports TO of any form (e.g., block TO, streaming TO, packet-based TO, HTTP traffic, etc.) through either or both of a user interface (UI) handler such as UI IO handler 840 and/or through any of a range of application programming interfaces (APIs), possibly through API TO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to fault tolerant access to file servers in multi-cluster computing environments. In some embodiments, a module may include one or more state machines and/or combinational logic used to implement or facilitate the operational and/or performance characteristics pertaining to fault tolerant access to file servers in multi-cluster computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of fault tolerant access to file servers in multi-cluster computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to fault tolerant access to file servers in multi-cluster computing environments, and/or for improving the way data is manipulated when performing computerized operations pertaining to implementing a high-availability file server capability by automatically directing file I/O requests to one of two or more synchronized file servers in accordance with the then-current status (e.g., health) of the file servers.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
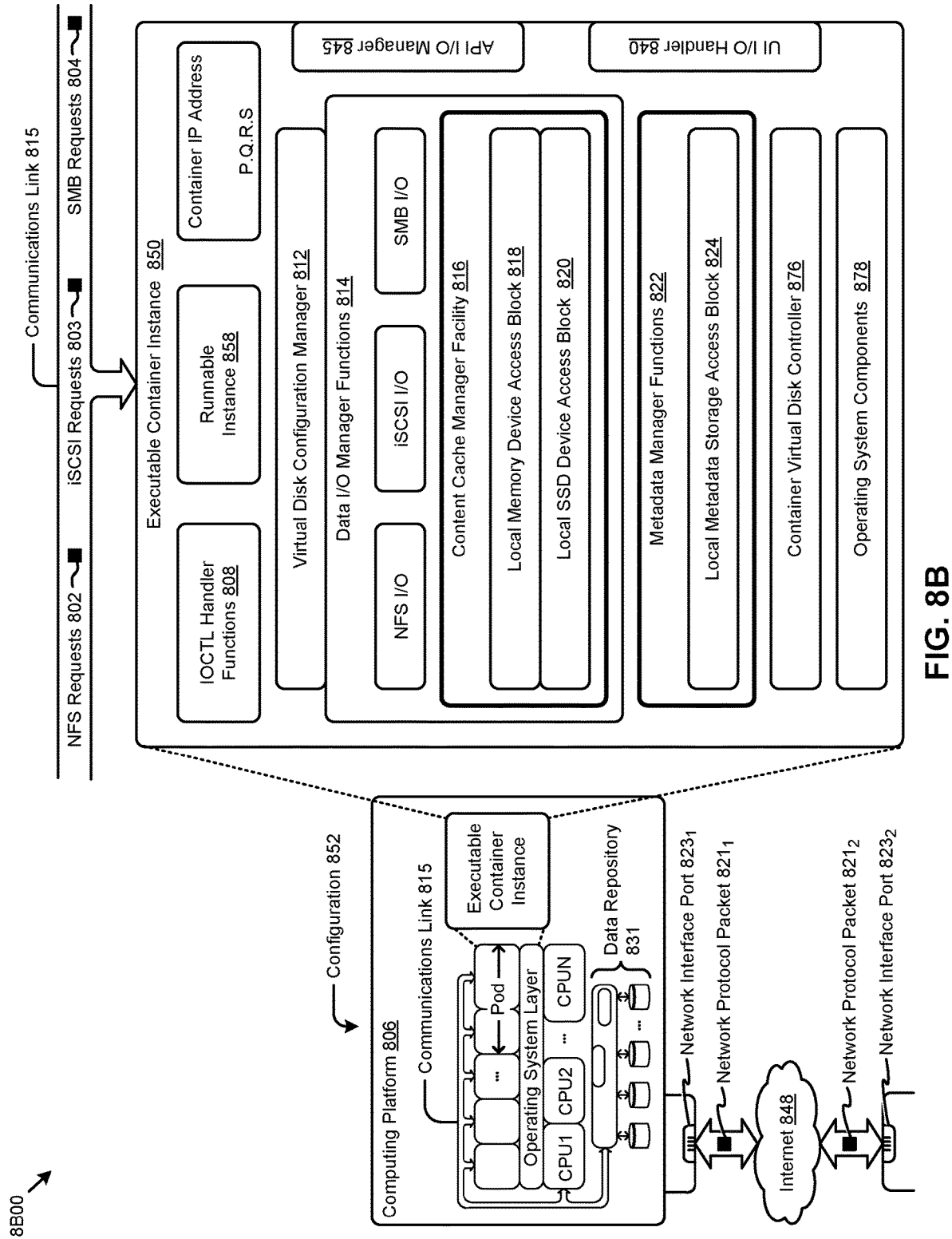

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
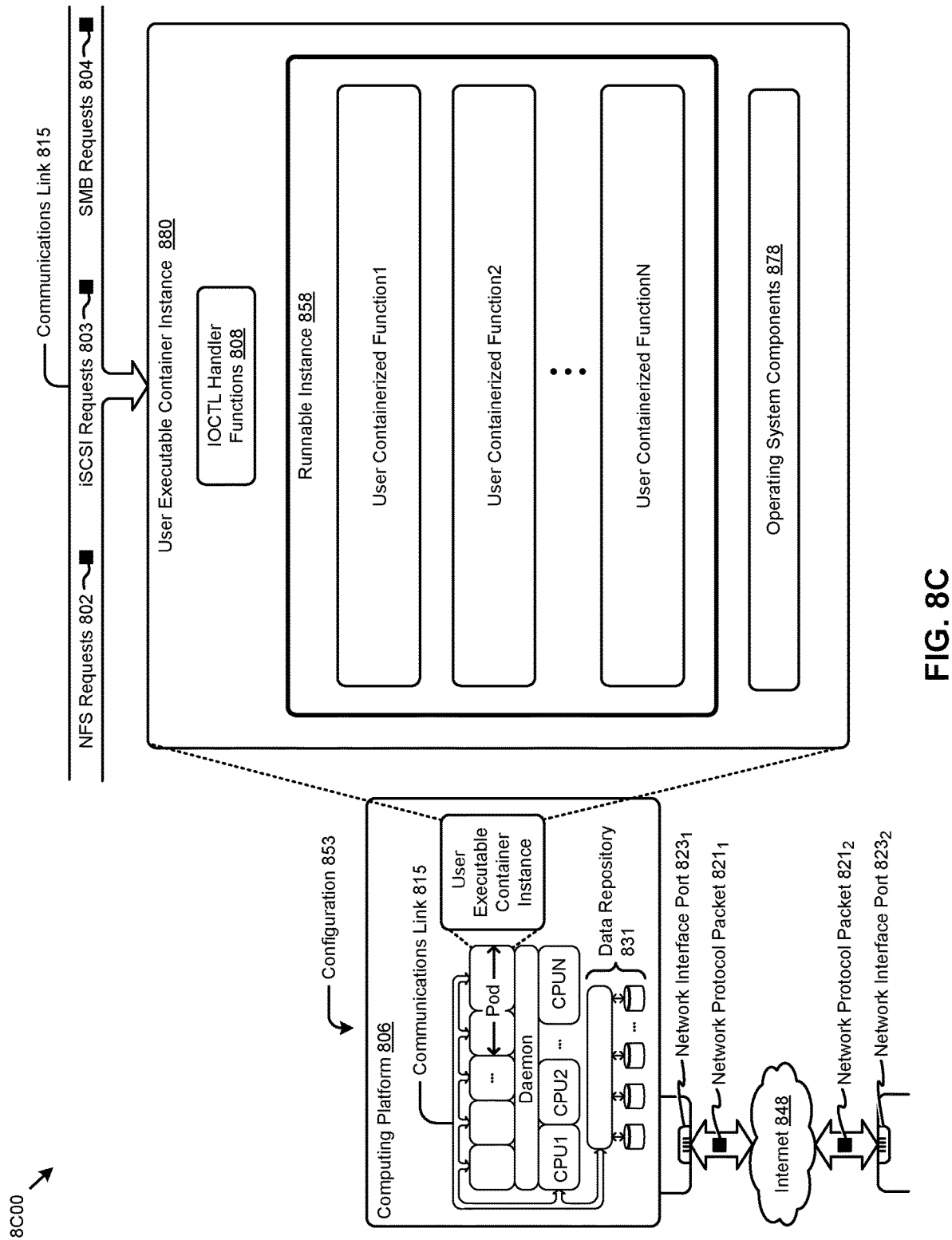

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for implementing high-availability of at least two file servers in a clustered computing environment, the method comprising:

synchronizing two file servers implemented as virtual machines to maintain synchronized file system content, wherein the two file servers correspond to a first cluster in a first failure domain having a first file server and a second cluster in a second failure domain having a second file server, the first file server designated as a primary file server, wherein the primary file server is the first file server of the two file servers to receive file I/O requests, and the second file server operating in a replication mode to the primary file server;

interfacing a file server witness in a third failure domain with the two file servers;

monitoring the two file servers to determine a first status indicator indicating an unhealthy condition in the first file server;

designating the second file server as the primary file server based at least in part on the first status indicator;

halting the synchronizing of the two files servers;

determining a second status indicator indicating that the previously unhealthy condition of the first file server has been remediated; and upon remediation of the unhealthy condition, resuming synchronizing the two file servers with the first file server operating in replication mode to the second file server, and the second file server remaining as the primary file server.

2. The method of claim 1, wherein (a) designating the second file server as the primary file server based at least in part on the first status indicator, and (b) determining a second status indicator indicating that the previously unhealthy condition of the first file server has been remediated, are performed by the file server witness.

3. The method of claim 2, wherein the file server witness monitors the two file servers and determines the first status indicator.

4. The method of claim 1, wherein designating the second file server as the primary file server involves an atomic operation.

5. The method of claim 1, further comprising:

issuing a synchronization control message, the synchronization control message being issued in response to the first status indicator.

6. The method of claim 5, wherein the synchronization control message is issued to halt synchronization or resume synchronization.

7. The method of claim 1, wherein the file server witness is implemented in a third cluster.

8. The method of claim 7, wherein the first file server is implemented in a first availability zone, the second file server is implemented in a second availability zone, and the file server witness is implemented in a third availability zone.

9. The method of claim 1, wherein the unhealthy condition in the first file server comprises at least one of an oversubscribed file server, a file server failure, a cluster failure, and a connection failure.

10. The method of claim 1, further comprising:

receiving a file I/O request from a host and first directing such file I/O request to the file server then-currently designated as the primary file server.

11. One or more non-transitory computer readable mediums having stored thereon a sequence of instructions which, when stored in memory and executed by one or more processors causes the one or more processors to perform a set of acts for implementing high-availability of at least two file servers in a clustered computing environment, the acts comprising:

synchronizing two file servers implemented as virtual machines to maintain synchronized file system content, wherein the two file servers correspond to a first cluster in a first failure domain having a first file server and a second cluster in a second failure domain having a second file server, the first file server designated as a primary file server, wherein the primary file server is the first file server of the two file servers to receive file I/O requests, and the second file server operating in a replication mode to the primary file server;

interfacing a file server witness in a third failure domain with the two file servers;

monitoring the two file servers to determine a first status indicator indicating an unhealthy condition in the first file server;

designating the second file server as the primary file server based at least in part on the first status indicator, halting the synchronizing of the two file servers;

determining a second status indicator indicating that the previously unhealthy condition of the first file server has been remediated; and upon remediation of the unhealthy condition, resuming synchronizing the two file servers with the first file server operating in replication mode to the second file server, and the second file server remaining as the primary file server.

12. The computer readable medium of claim 11, wherein (a) designating the second file server as the primary file server based at least in part on the first status indicator, and (b) determining a second status indicator indicating that the previously unhealthy condition of the first file server has been remediated, are performed by the file server witness.

13. The computer readable medium of claim 12, wherein the file server witness monitors the two file servers and determines the first status indicator.

14. The computer readable medium of claim 11, wherein designating the second file server as the primary file server involves an atomic operation.

15. The computer readable medium of claim 11, further comprising instructions which, when stored in memory and executed by the processor causes the processor to perform acts of:

issuing a synchronization control message, the synchronization control message being issued in response to the first status indicator.

16. The computer readable medium of claim 15, wherein the synchronization control message is issued to halt synchronization or resume the synchronization.

17. The computer readable medium of claim 11, wherein the file server witness is implemented in a third cluster.

18. The computer readable medium of claim 17, wherein the first file server is implemented in a first availability zone, the second file server is implemented in a second availability zone, and the file server witness is implemented in a third availability zone.

19. A system for implementing high-availability of at least two file servers in a clustered computing environment, the system comprising:

one or more storage mediums having stored thereon a sequence of instructions; and one or more processors that execute the instructions to cause the processor to perform a set of acts, the acts comprising, synchronizing two file servers implemented as virtual machines to maintain synchronized file system content, wherein the two file servers correspond to a first cluster in a first failure domain having a first file server and a second cluster in a second failure domain having a second file server, the first file server designated as a primary file server, wherein the primary file server is the first file server of the two file servers to receive file I/O requests, and the second file server operating in a replication mode to the primary file server;

interfacing a file server witness in a third failure domain with the two file servers;

monitoring the two file servers to determine a first status indicator indicating an unhealthy condition in the first file server;

designating the second file server as the primary file server based at least in part on the first status indicator;

halting the synchronizing of the two file servers;

determining a second status indicator indicating that the previously unhealthy condition of the first file server has been remediated; and upon remediation of the unhealthy condition, resuming synchronizing the two file servers with the first file server operating in replication mode to the second file server, and the second file server remaining as the primary file server.

20. The system of claim 19, wherein the file server witness is implemented in a third cluster.

21. The system of claim 20, wherein the first file server is implemented in a first availability zone, the second file server is implemented in a second availability zone, and the file server witness is implemented in a third availability zone.

22. The system of claim 19, further comprising issuing a synchronization control message, the synchronization control message being issued in response to the first status indicator.

23. The system of claim 19 wherein (a) designating the second file server as the primary file server based at least in part on the first status indicator, and (b) determining a second status indicator indicating that the previously unhealthy condition of the first file server has been remediated, are performed by the file server witness.

24. The system of claim 23, wherein the file server witness monitors the two file servers and determines the first status indicator.

25. The system of claim 19, wherein the unhealthy condition of the first file server comprises at least one of an oversubscribed file server, a file server failure, a cluster failure, and a connection failure.

26. The system of claim 19, wherein (a) designating the second file server as the primary file server based at least in part on the first status indicator, and (b) determining a second status indicator indicating that the previously unhealthy condition of the first file server has been remediated, are performed by the file server witness.

27. The system of claim 26, wherein the file server witness monitors the two file servers and determines the first status indicator.

28. The system of claim 19, wherein designating the second file server as the primary file server involves an atomic operation.

* * * * *